United States Patent
Reiker

(10) Patent No.: US 6,207,898 B1
(45) Date of Patent: Mar. 27, 2001

(54) ELECTRICAL BOX WITH FIXTURE SUPPORT

(75) Inventor: Kenneth H. Reiker, Shalimar, FL (US)

(73) Assignee: Reiker Enterprises of Northwest Florida, Inc., Solvay, NY (US)

( * ) Notice: Subject to any disclaimer, the term of this patent is extended or adjusted under 35 U.S.C. 154(b) by 0 days.

(21) Appl. No.: 09/317,155

(22) Filed: May 24, 1999

Related U.S. Application Data

(63) Continuation-in-part of application No. 08/905,077, filed on Aug. 1, 1997, now Pat. No. 5,907,124, which is a continuation-in-part of application No. 08/862,379, filed on May 23, 1997, now Pat. No. 5,965,845, which is a continuation-in-part of application No. 08/862,378, filed on May 23, 1997, now Pat. No. 5,909,006, which is a continuation-in-part of application No. 08/490,757, filed on Jun. 15, 1995, now Pat. No. 5,677,512, which is a continuation-in-part of application No. 08/371,695, filed on Jan. 12, 1995, now Pat. No. 5,854,443

(60) Provisional application No. 60/023,060, filed on Aug. 2, 1996.

(51) Int. Cl.$^7$ ........................................................ H02B 1/30
(52) U.S. Cl. ................................ 174/61; 174/63; 220/3.9
(58) Field of Search ................................ 174/51, 58, 61, 174/62, 63, 48, 53, 57, 17 R; 220/3.2, 3.3, 3.9, 3.8, 3.92, 3.94, 4.02; 248/906, 205.3

(56) References Cited

U.S. PATENT DOCUMENTS

| | | |
|---|---|---|
| Re. 33,147 | 1/1990 | Reiker . |
| Re. 34,603 | 5/1994 | Caison et al. . |
| 950,176 | 2/1910 | Hublinger . |
| 1,066,706 | 7/1913 | Caine . |
| 1,824,708 | 9/1931 | Davis et al. . |
| 1,922,432 | 8/1933 | Gould . |
| 2,031,689 * | 2/1936 | Buckels ............................ 248/906 X |
| 2,423,757 | 7/1947 | Dedge . |
| 2,959,633 | 11/1960 | Palmer et al. . |
| 3,168,613 | 2/1965 | Palmer . |
| 3,340,349 | 9/1967 | Zerwes . |
| 3,616,096 | 10/1971 | Roeder . |
| 3,740,451 | 6/1973 | Schindler et al. . |
| 3,877,601 | 4/1975 | Evans et al. . |
| 4,019,647 | 4/1977 | Arnold . |
| 4,050,603 | 9/1977 | Harris et al. . |
| 4,062,470 * | 12/1977 | Boteler ................................ 220/3.3 |
| 4,062,512 | 12/1977 | Arnold . |

(List continued on next page.)

FOREIGN PATENT DOCUMENTS

| | | | |
|---|---|---|---|
| 1309950 | 5/1973 | (GB) . | |
| 2212004 * | 7/1989 | (GB) ..................................... 174/51 |

* cited by examiner

Primary Examiner—Dean A. Reichard
Assistant Examiner—Dhiru R Patel
(74) Attorney, Agent, or Firm—Schlesinger, Arkwright & Garvey LLP

(57) ABSTRACT

An electrical junction box or mounting assembly includes a box having a top wall and a side wall. The side wall extends downwardly away from the top wall and defines a cavity therein. A fixture support is disposed on the box. The fixture support may be disposed inside or outside the cavity of the box. By locating the fixture support outside the cavity of box, the user can see how strong the fixture support is. The fixture support may be made of metal, and the side wall and/or top wall may be made of plastic. A friction surface, such as fluting, may be provided on the fixture support for engaging with the junction box for preventing rotation and other relative movement of the fixture support relative to the box. An adhesive sufficiently strong to adhere the junction box to a support surface may be provided on one of the walls of the junction box. The adhesive may be in the form of double-sided tape.

24 Claims, 15 Drawing Sheets

U.S. PATENT DOCUMENTS

| | | |
|---|---|---|
| 4,082,915 | 4/1978 | Silver . |
| 4,176,758 | 12/1979 | Glick . |
| 4,249,035 | 2/1981 | Watley . |
| 4,275,862 | 6/1981 | Takagi et al. . |
| 4,281,773 | 8/1981 | Mengeu . |
| 4,304,957 | 12/1981 | Slater et al. . |
| 4,306,109 | 12/1981 | Nattel . |
| 4,315,100 | 2/1982 | Haslbeck et al. . |
| 4,331,832 | 5/1982 | Curtis et al. . |
| 4,348,547 * | 9/1982 | Bowden, Jr. .............. 174/65 R |
| 4,403,708 * | 9/1983 | Smolik .................... 220/3.5 |
| 4,408,696 | 10/1983 | Crosson . |
| 4,424,406 | 1/1984 | Slater et al. . |
| 4,578,528 * | 3/1986 | Borsh et al. ............ 174/65 G |
| 4,684,092 | 8/1987 | Reiker . |
| 4,733,330 | 3/1988 | Tanaka et al. . |
| 4,770,311 | 9/1988 | Wang . |
| 4,874,904 * | 10/1989 | Desanti .................... 174/53 |
| 4,892,211 | 1/1990 | Jorgensen . |
| 4,909,405 | 3/1990 | Kerr, Jr. . |
| 4,960,964 | 10/1990 | Schnell et al. . |
| 4,988,067 | 1/1991 | Propp et al. . |
| 5,303,894 | 4/1994 | Deschamps et al. . |
| 5,359,152 | 10/1994 | Hone-Lin . |
| 5,407,088 | 4/1995 | Jorgensen et al. . |
| 5,435,514 | 7/1995 | Kerr, Jr. . |
| 5,486,650 | 1/1996 | Yetter . |
| 5,522,577 | 6/1996 | Roesch . |
| 5,710,392 * | 1/1998 | Bordwell et al. .......... 174/50 |
| 5,762,223 | 6/1998 | Kerr, Jr. . |
| 5,860,548 | 1/1999 | Kerr, Jr. . |
| 5,907,124 * | 5/1999 | Reiker ..................... 174/51 |

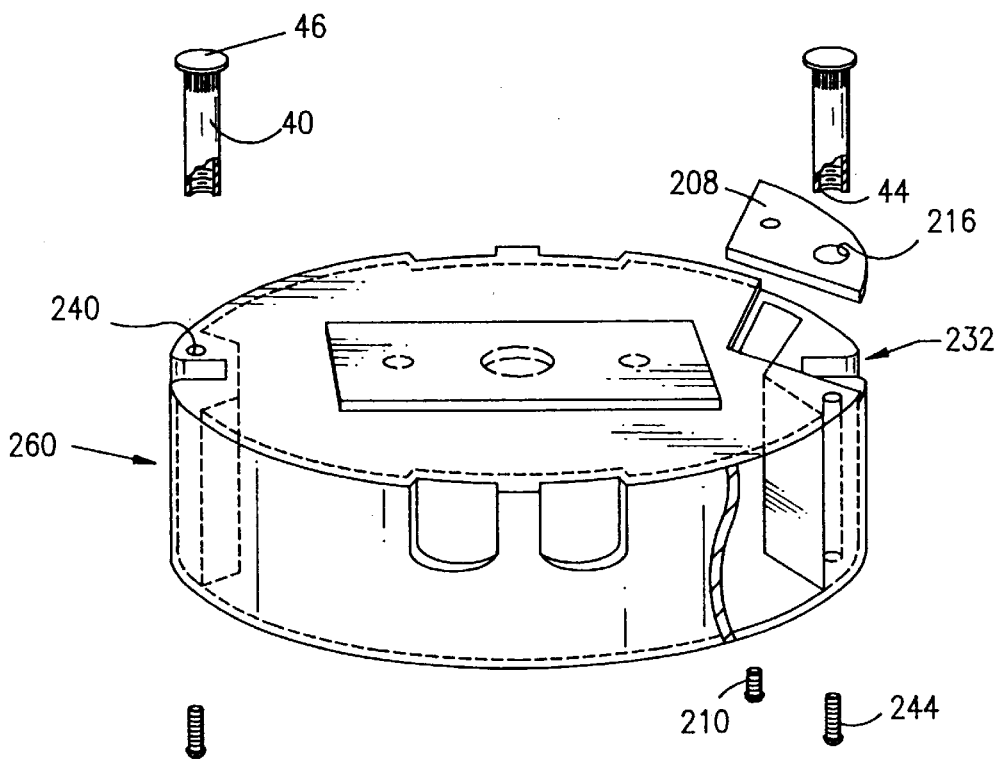
FIG. 15
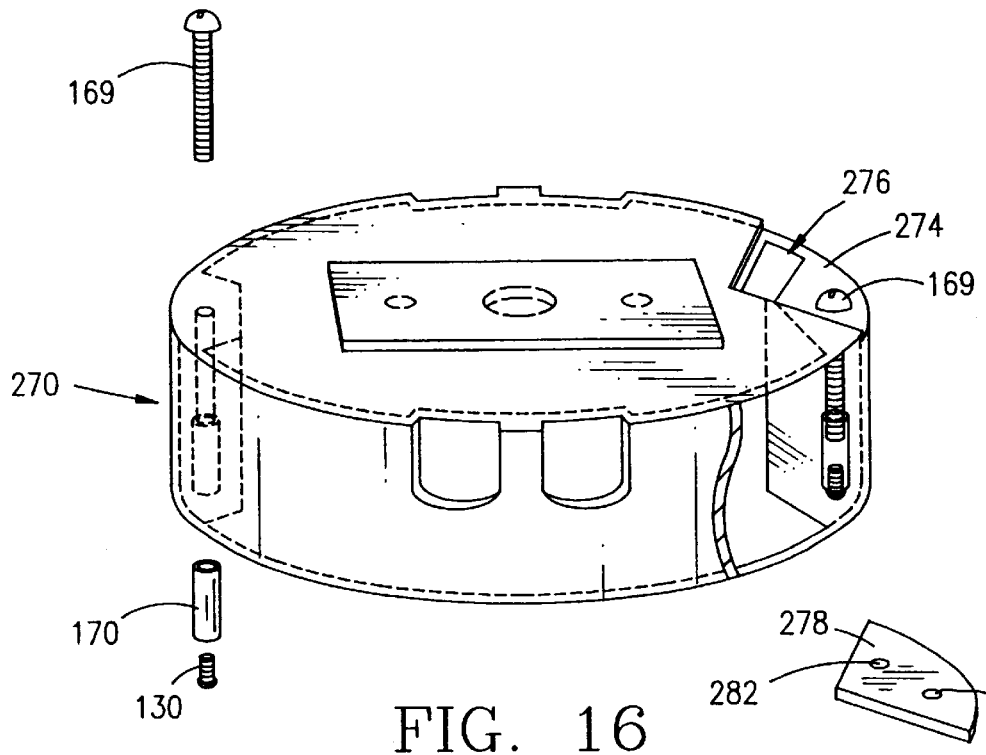
FIG. 16
FIG. 16A

ELECTRICAL BOX WITH FIXTURE SUPPORT

CROSS-REFERENCE TO RELATED APPLICATIONS

This application is a continuation-in-part of application Ser. No. 08/905,077, filed Aug. 1, 1997 now U.S. Pat. No. 5,907,124, which is a continuation-in-part of application Ser. No. 08/862,379, filed May 23, 1997 now U.S. Pat. No. 5,965,845, and application Ser. No, 08/905,077 is a continuation-in-part of application Ser. No. 08/862,378, filed May 23, 1997 now U.S. Pat. No. 5,909,006, and application Ser. No. 08/905,077 claims priority of provisional application No. 60/023,060, filed Aug. 2, 1996, and application Ser. No. 08/905,077 is a continuation-in-part of application Ser. No. 08/490,757, filed Jun. 15, 1995, now U.S. Pat. No. 5,677,512, and which application Ser. No. 08/490,757 was a continuation-in-part of application Ser. No. 08/371,695, filed Jan. 12, 1995, now U.S. Pat. No. 5,854,443 and each of which is incorporated herein by reference.

This application likewise relates to four(4) of applicant's applications: application Ser. No. 08/905,142 now U.S. Pat. No. 5,981,874,; 08/905,141; 08/904,691; 08/904,869 now U.S. Pat. No. 5,883,331, each filed on Aug. 1, 1997, and each of which is incorporated herein by reference.

FIELD OF THE INVENTION

The present invention relates to electrical boxes and methods of producing the same.

BACKGROUND OF THE INVENTION

Consumers, updated National Electrical Codes (NEC), and Underwriter Laboratories (UL) requirements all require that electrical boxes be made stronger than in the prior art.

OBJECTS AND SUMMARY OF THE INVENTION

An object of the invention is to overcome the drawbacks of known electrical boxes.

A further object of the invention includes making electrical boxes which use the standard punched-out, stamped electrical boxes in a more intelligent fashion.

Yet another object of the invention is to take out the radius of standard industry size electrical box so that a support for supporting a fixture can be located the proper distance from a second support to meet National Electrical Code (NEC) standards.

Another object of the invention is to eliminate the problem of pure plastic boxes being unusable for heavy-duty use.

Another object of the invention is to provide a junction box in which the fixture supports are visible to the user, so that the user can see how strong the supports are, and be assured that the supports have been supplied with the box.

Another object of the invention is to achieve a strengthened electrical box with a supplemental support within a standard so-called "4x4" box, while maintaining the near universal 3.5 inch (8.9 cm) spacing between the fixture supports so that the box is usable with standard light fixtures, ceiling fans, and the like.

It is likewise an object of the invention to provide metal supplemental supports in non-metallic and/or plastic electrical boxes to enhance the carrying strength of the electrical boxes.

Yet another object of the invention is to provide studs in the electrical boxes which cover the threads of standard screws so that no screw threads are present in the interior of such electrical boxes.

A still further object of the invention is to provide an electrical box having a sufficiently smooth interior for preventing wear to the plastic coating of plastic-coated electrical wire.

It is yet another object of the invention to provide electrical boxes in which added supports, such as studs, are added during the manufacturing process to eliminate problems in prior art electrical boxes, as well as to strengthen the inventive electrical boxes.

Another object of the invention is to provide a junction box having a supplemental support, yet which requires no welding during assembly thereof.

Yet another object of the invention is to provide an electrical box having components which are easily fabricated, added to the electrical box, and assembled in the final form by the operation of screwing or riveting, yet which do not loosen when subjected to static and/or dynamic loading.

A still further object of the invention is to provide a plastic junction box having metal components that is a "marriage" of plastic and metal and which enhances and exploits the properties of both materials.

A still further object of the invention is to provide a junction box capable of carrying static and/or dynamic loads having an auxiliary support and that is assembled with fewer parts and with fewer steps than known devices.

It is a yet further object that all the above be carried out with an electrical box which carries the static and dynamic load of supported fixtures better than known electrical boxes.

It is another object of the invention to provide a junction box which is made of plastic, yet which is self-grounded.

It is a still further object of the invention to maximize the use of non-metallic materials in a junction box, while minimizing the use of metallic materials in junction boxes.

A still further object of the invention is to provide a plastic junction box which can support both light fixtures and ceiling fans.

In summary, the present invention is directed to an electrical junction box or mounting assembly having a top wall and a side wall. The side wall extends downwardly away from the top wall and defines a cavity therein. A hole is provided in at least one of the top wall and the side wall, and a fixture support is disposed in the hole.

The present invention is likewise directed to a mounting assembly of the above type in which a hole is provided on the fixture support, and the threaded hole is sized for mating with the threads of a fixture fastener. The fastener may be a screw. The fixture support may be made of metal, and the side wall and/or top wall may be made of plastic.

The fastener may be a stud having the threaded hole therein. Flutes may be provided on the stud for engaging with the plastic/metal side wall for preventing rotation of the stud.

An adhesive sufficiently strong to adhere the junction box to a support such as a downwardly facing support surface may be provided on the top wall of the junction box. The adhesive may be in the form of double-sided tape.

The invention is likewise directed to a mounting assembly including a junction box having a cavity and a fixture support disposed outside the cavity.

These objects and advantages as well as others will be readily apparent from a review of the following description and drawings.

The drawings show a variety of embodiments of the invention, as will be clear from reading the description below.

It is important to note that the use of relative terms such as "up" and "down", and "left" and "right" is for convenience only and is not intended to be limiting.

BRIEF DESCRIPTION OF THE DRAWINGS

FIG. 15 is a perspective, exploded view of another junction box according to the invention;

FIG. 16 is a perspective, exploded view of a further junction box according to the invention;

FIG. 16A illustrates an optional grounding plate for use with the junction box of FIG. 16;

DESCRIPTION OF THE PRIOR ART

Figure 1:
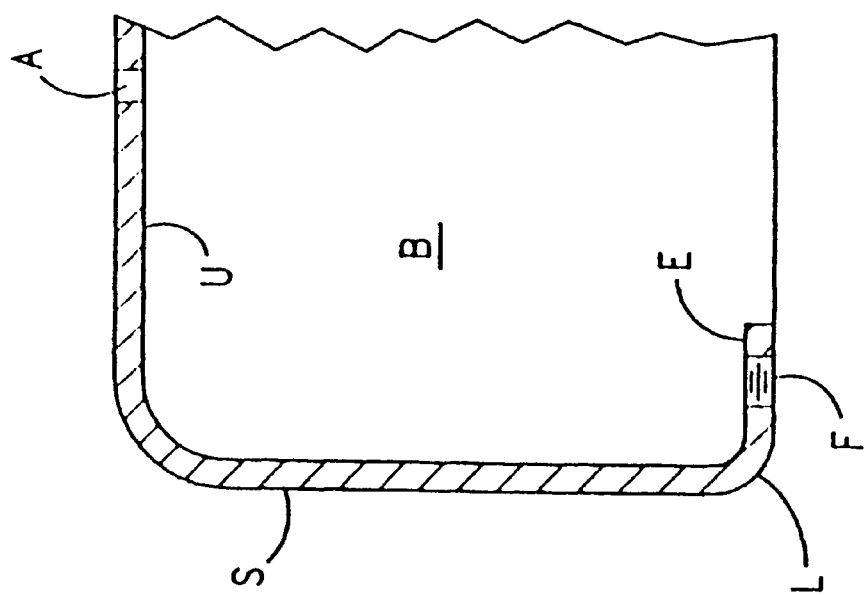
FIG. 1 is a cross sectional view of a PRIOR ART electrical junction box having an inwardly extending ear E with a face plate attachment hole F provided therein.

FIG. 1 shows a PRIOR ART junction box including a side wall S, an upper wall U, and an ear E extending from a lower portion L thereof.

Upper wall U has one or more attachment holes A through which fasteners will be inserted for attaching PRIOR ART electrical box B to an overhead surface, such as to a ceiling joist or piece of plywood extending therebetween.

A lower, faceplate attachment hole F is typically provided in inwardly extending ear E. Frequently, faceplate hole F is provided with threads for mating with respective faceplate fasteners when securing an unillustrated faceplate thereto. Such faceplates are used to enclose electrical box B after the wiring inside the electrical box/junction box B has been completed.

A drawback of such PRIOR ART electrical boxes B is that they are typically made with stamped sheet metal extensions E; consequently, extensions E are relatively thin (i.e., in the order of about 1 millimeter or less). Such extension or ear E has a width of only a few millimeters, and only extends several millimeters inside box B. Thus, the surface area of ear E, when viewed from below after installation of upper wall U against a typical horizontal ceiling, is often substantially less than one centimeter squared (1 $cm^2$).

Consequently, ear E may only carry relatively small vertical loads, when installed against the ceiling, as described above.

As a result, local codes frequently allow such PRIOR ART boxes B to be used only for supporting the weight of a faceplate, or of a relatively light static load, such as a small light fixture.

Such electrical boxes B are unsuited for supporting large static loads, as well as for supporting large dynamic loads, such as ceiling fans which may weigh twenty-five kilograms or more (25 kg).

Thus, there is a need for an electrical box which is suited for carrying relatively large static loads as well as dynamic loads.

That need is especially clear, given that many homeowners want to install heavier light fixtures and dynamic loads, such as ceiling fans, than had exhibited such preferences in the past.

Furthermore, even if the initial owner/builder of a house or commercial space provides PRIOR ART load-carrying junction boxes B suited for carrying the vertical force of a small light fixture, a subsequent owner/user will often replace the original light fixture with a heavier light fixture, or with a dynamic load; i.e. a ceiling fan.

Accordingly, there is a need for a load-carrying junction box which is suited for a wide range of static and dynamic loads and, thus, suited for original installation in new construction, given that some users fail to upgrade load-carrying junction boxes when adding heavier static and/or dynamic loads to the box.

The electrical box according to the invention has overcome these drawbacks described immediately above, and has achieved the objects of the invention detailed above. Such will be evident when reading the following detailed description of the invention.

DETAILED DESCRIPTION OF THE INVENTION

Figure 2:
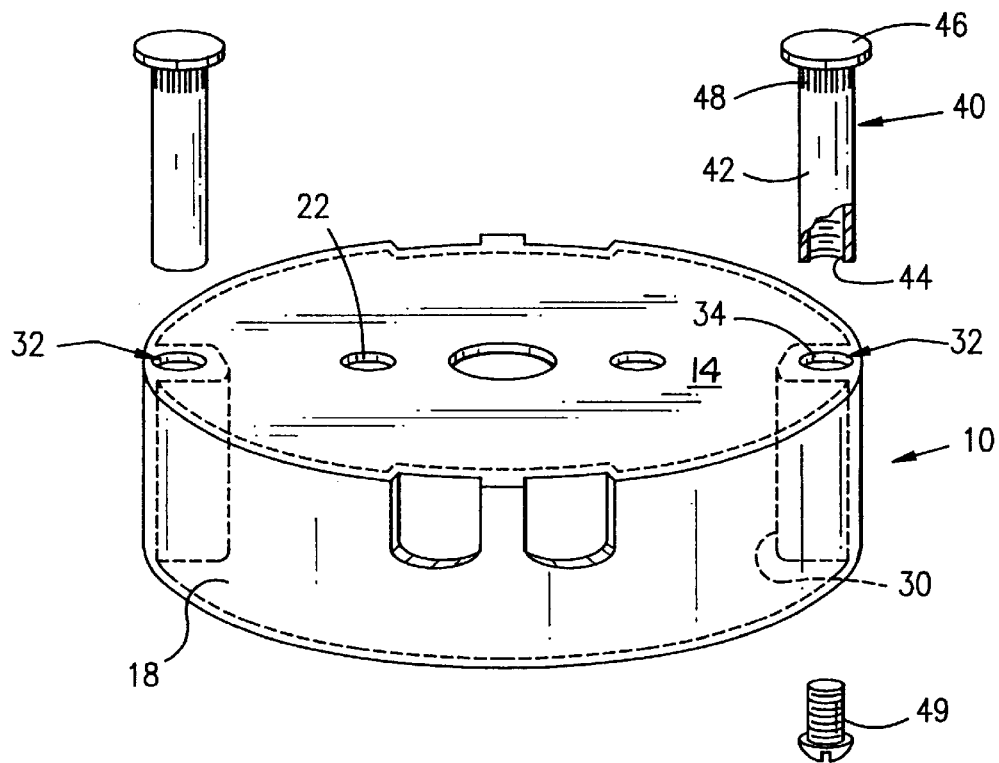
FIG. 2 is a perspective view of a preferred embodiment of an electrical junction box according to the invention showing the use of a fluted support on the junction box.
Figure 3:
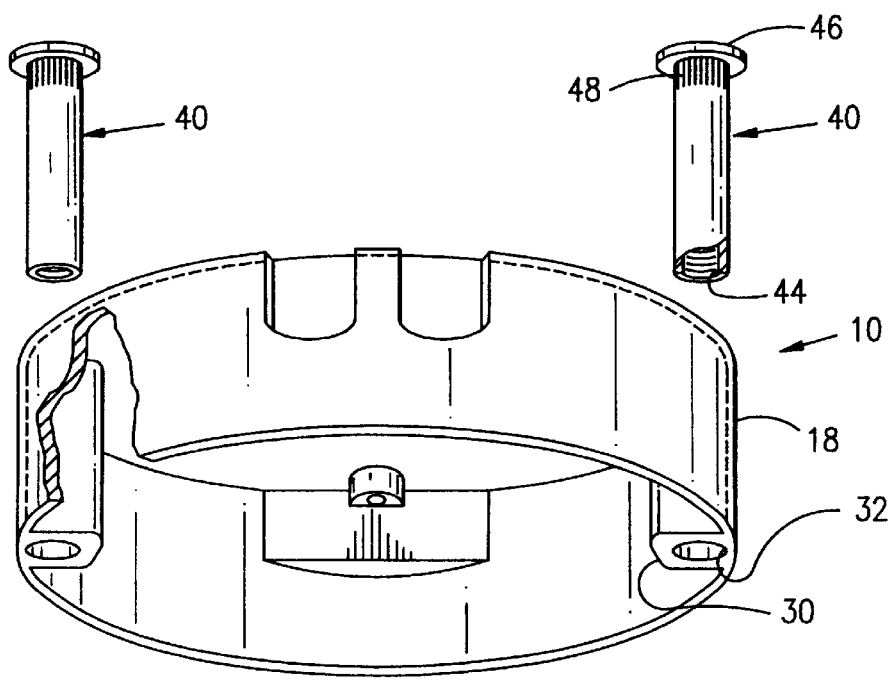
FIG. 3 is a perspective view of the support of FIG. 2.

Turning to FIGS. 2–3, a first preferred embodiment of a mounting assembly including an electrical box and/or junction box 10 according to the invention will now be described in detail.

Junction box 10 includes a top wall 14, and a side wall 18 extending downwardly therefrom and defining a cavity therein. one or more hole 22 are provided in top wall 14 through which a fastener, such as a screw or nail, is inserted for securing junction box 10 to a support surface, such as a wall or the downwardly facing lower face of a ceiling joist.

Box 10 may have an extension 30 attached to and extending away from side wall 18. Extension 30 may extend inwardly (as shown) or outwardly away from the outer face of side wall 18, depending on the intended use.

A hole 32 is provided in box 10. Hole 32 may be formed in side wall 18. Hole 32 may extend through extension 32, for enhancing the overall load capacity for carrying electrical fixtures, such as lights and ceiling fans, as will be appreciated more fully from reading the following.

Hole 32/extension 30 includes an upper edge/portion 34, suited for engaging a fixture support 40.

Fixture support 40 includes a shaft 42, a head 46 and a friction surface, such as fluting or a raised surface or a roughened surface 48 thereon. When fixture support 40 is secured in hole 30 and, hence, relative to the remainder of junction box 10, fluting 48 preferably engages upper portion 34 for resisting rotation of fixture support 40 about its longitudinal axis. Such resistance to rotation is particularly important when fixture support 40 carries a ceiling fan attached thereto by use of ceiling fan fasteners 49 engaged with internal threads 44. Such resistance to movement/rotation of fixture support 40 reduces the possibility that the connection between ceiling fan fasteners and junction box 100 occur. Such loosening has been known to occur in prior art devices, especially given the prevalence of reversible ceiling fans, and even when non-reversible ceiling fans have been attached, owing simply to the high static and dynamic loading of ceiling fans acting on prior art ceiling fan fasteners and prior art supports.

Fluting 48 is also useful to ensure that fixture support 40 remains in place during production, packaging, shipping, marketing and use thereof.

Fluting 48 may be provided at a different location on fixture support 40 other than as shown, at multiple locations, or along the entire length of shaft 42.

Figure 4:
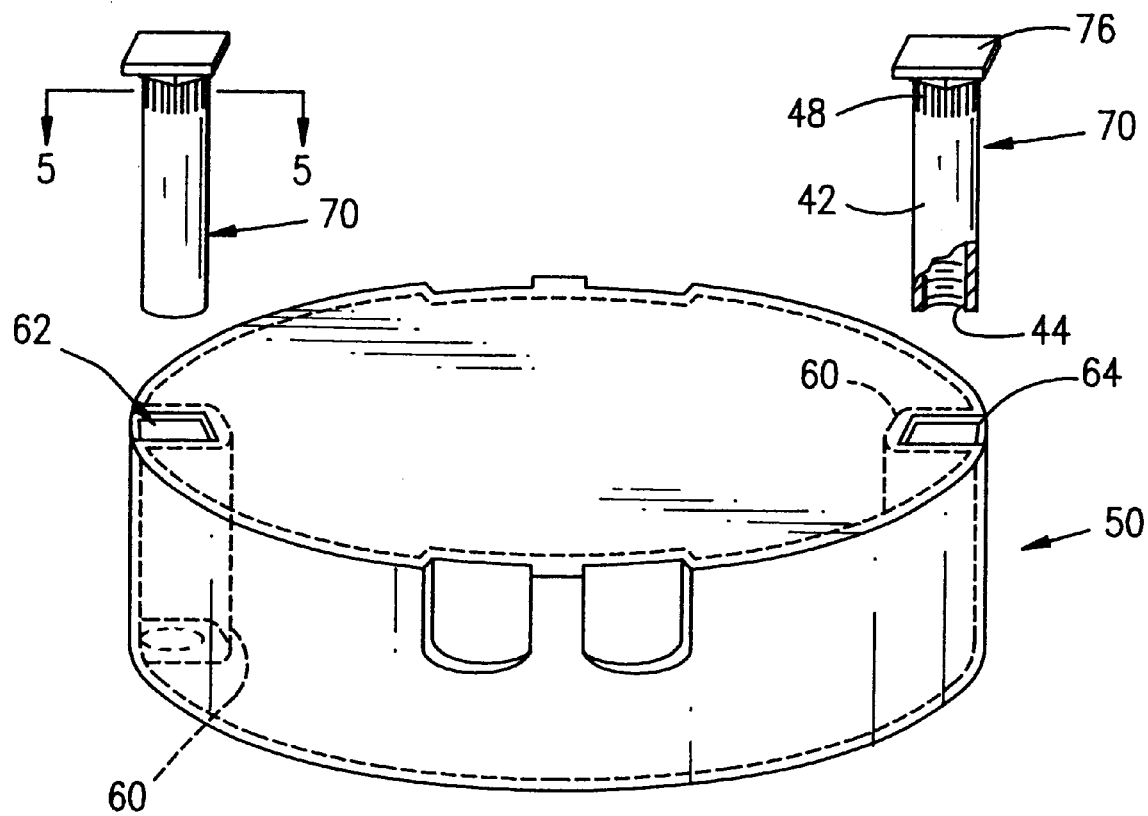
FIG. 4 is a perspective view of another preferred embodiment of. a support according to the invention.

FIG. 4 illustrates another preferred embodiment of a junction box 50 according to the invention.

Junction box 50 includes an extension 60 having a hole 62 therein. Hole 62/extension 60 includes an upper edge/portion 64, such as the illustrated stepped square portion 64.

A fixture support 70 is similar to fixture support 40, except that a substantially square head 76 is provided thereon.

Stepped, square portion 64 is preferably configured to mate with head 76 of fixture support 70. Stepped, square portion 64 may be formed sufficiently deep so that head 76 does not protrude above the outer surface of top wall 14, when support 70 is installed.

It will be appreciated that square head 76 is particularly useful for intended uses in which the expected loading would be greater than the typical rotational loading/forces to which fluting 48 alone would be subjected.

Needless to say, head 76, and head 46 of the embodiment of FIGS. 2–3, both serve to prevent fixture support 70 and 40, respectively, from being pulled away from the remainder of boxes 50 and 10, such as by increasing the surface area over which such downwardly exerted forces are spread over box 10 by such forces acting on fixture fasteners 49 secured in internal threads 44.

Figure 5:
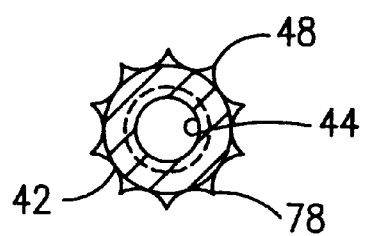
FIG. 5 is a cross-sectional view taken along line 5—5 of FIG. 4.

FIG. 5 illustrates additional detail of fluting 48 on shaft 42 of fixture supports 40 and 70 of FIGS. 2–4, respectively. Typically, about 1–14 flutes will be provided on shaft 44 having an outside diameter (O.D.) of 0.25 inches. It is contemplated that 15 flutes 78 or more will be provided, depending on the intended use. As will be readily appreciated, to enhance the rotational resistance of fixture supports 40 and 70, fewer, longer (i.e., in the direction of outward extension and/or along the length of shaft 42) are preferable to a greater number of flutes 78 of shorter length and outward extension.

In the case where holes 22 of FIGS. 2–3 and holes 62 of box 50 of FIG. 4 are formed in plastic material, such as fiberglass reinforced plastic (FRP), fluting 48 typically engages such plastic material even better than when holes 22 and 62 are formed in a metal portion of the respective junction boxes.

Figure 6:
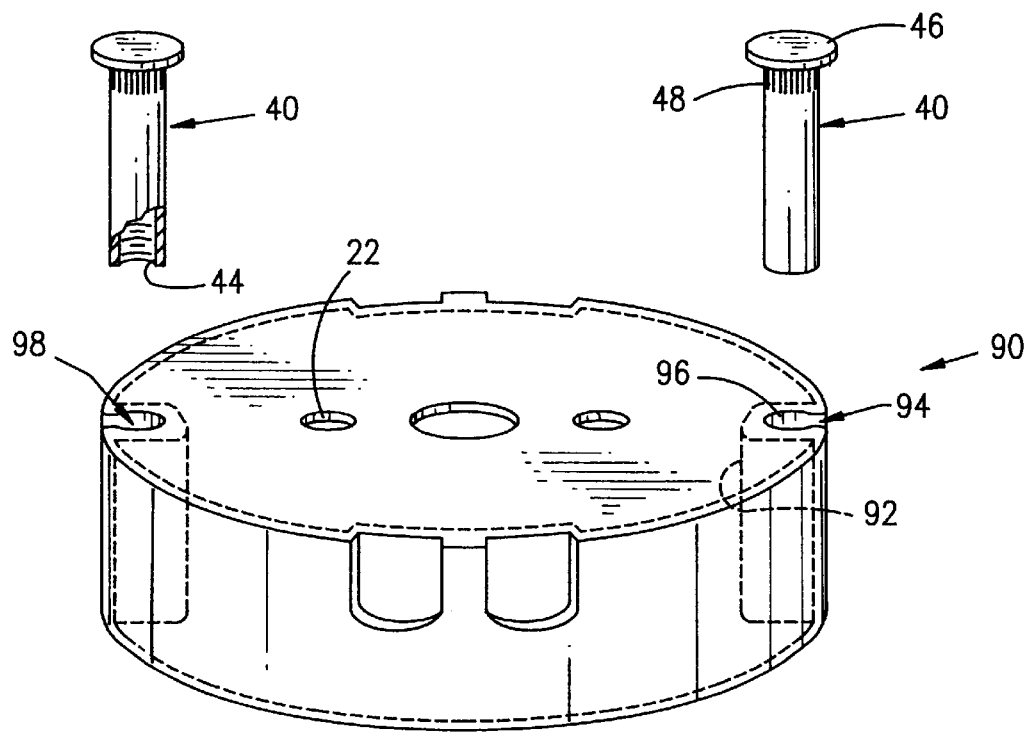
FIG. 6 is a perspective view of another preferred embodiment of a box according to the invention.

FIG. 6 illustrates a junction box 90 according to yet a still preferred embodiment of the invention.

Junction box 90 includes features as in the above-described boxes, with the additional features such as an extension 92 in which an opening 94 which is open to the outside of the box is defined. Opening 94 is useful for allowing a potential customer to see a portion of fixture support 40 extending down through an upper portion of a hole 98, so as to gain a better appreciation of the features of junction box 90.

Hole 98 for receiving fixture fastener 40 will be configured for closely engaging preferably at least fluting 48 of fastener 40. It is contemplated that hole 98 will snugly engage fixture support 40 along as much as the entire length of shaft 42. Fluting 48 engages upper portion 96 of hole 98, in the manner described above.

Figure 7:
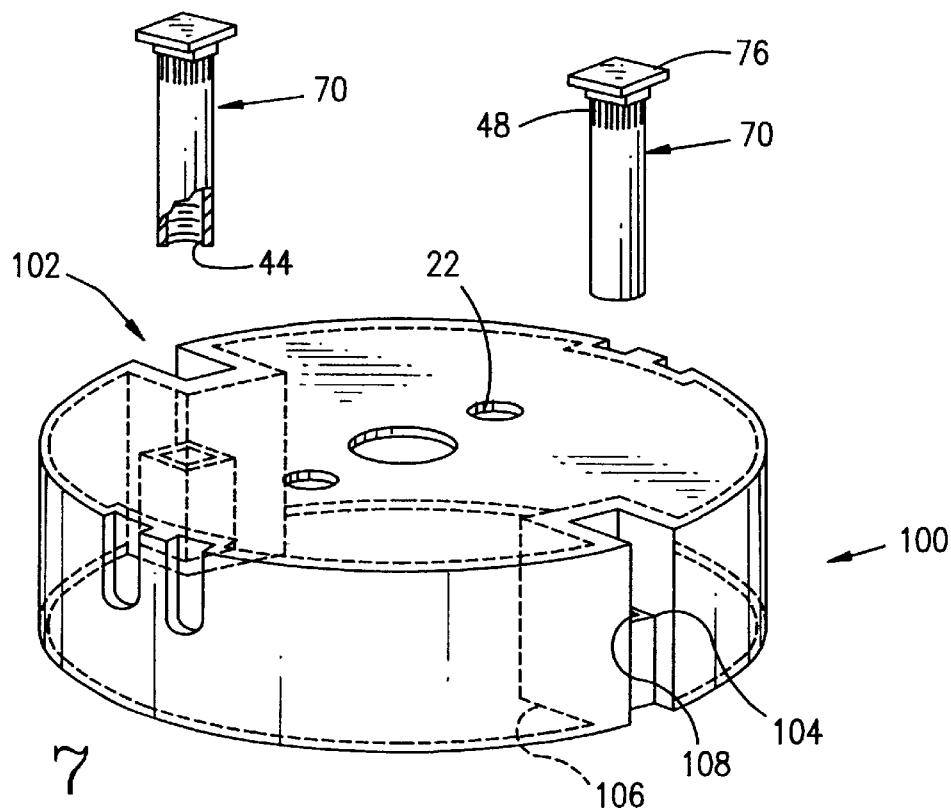
FIG. 7 is a perspective view of yet another preferred embodiment of a box according to the invention.

Turning to FIG. 7, a still preferred embodiment of a junction box 100 according to the invention is shown.

Box 100 includes a recess or opening or an indentation 102 having a seat 104 disposed therein. Recess or opening or an indentation 102 is provided in side wall 18 or an extension 106 provided on side wall 18.

A hole 108 is sized and configured for receiving fixture fastener 70, as described above. For example, fluting 48 engages an upper portion of hole 108 in the region of seat 104, as will be readily appreciated.

Preferably, recess 102 is sized and configured for receiving square head 76 of fixture support 70 with little or no free space between the outer perimeter of head 76 and the three (3) upwardly extending squared off walls of recess 102.

Needless to say, the tighter the fit between the three (3) upstanding walls of recess 102 and the three (3) sides of 4-sided square head 76 which do not face outwardly of recess 102, when installed, the greater the resistance to rotation of fixture support 70 about its longitudinal axis. Such resistance to rotation assists fluting 48 in resisting rotational movement, which rotational movement might lead to the loosening of the connection between fixture fastener 70 and the remainder of box 100 and, less desirably, loosening of the connection between the fastener, such as fan fastener 49 of FIG. 2, for the installed electrical fixture (e.g., ceiling fan, chandelier, light).

Figure 8:
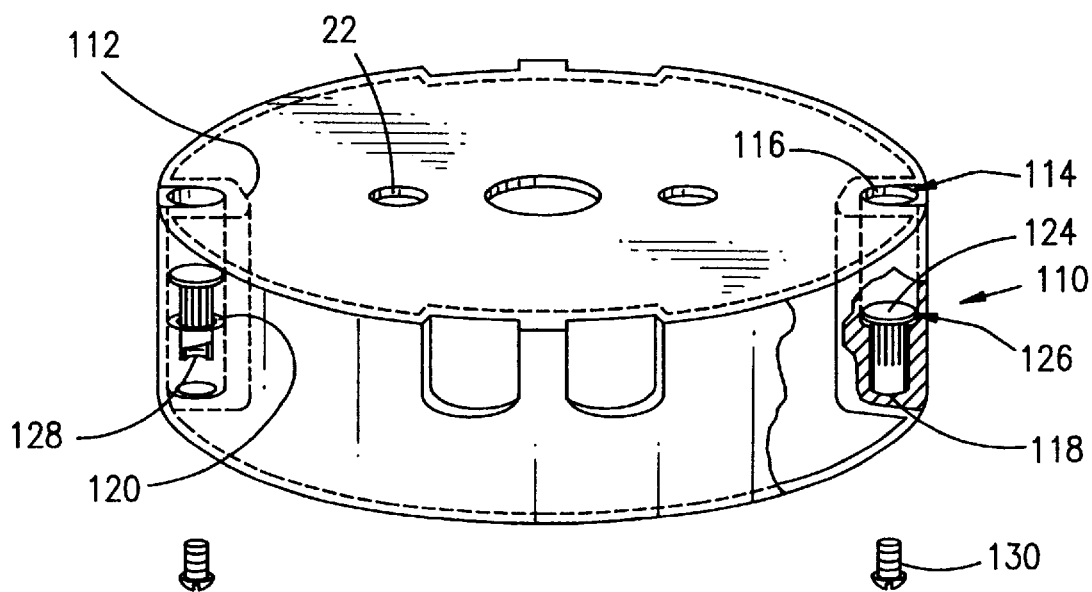
FIG. 8 is a perspective view of another preferred embodiment of a junction box according to the invention.

FIG. 8 illustrates a junction box 110 according to a yet still further preferred embodiment of the invention.

Box 110 includes an optional extension 112 strengthening the region around the side wall in which a hole 114 is defined.

Hole 114 includes an upper portion 116 and a lower portion 118, which lower portion 118 begins at a seat 120 for receiving a head 124 of a fixture support 126.

Fixture support 126 includes, preferably, internal threads 128 which mate with the threads of a fixture fastener 130.

Fixture support 126 may have fluting 58 for engaging with the material of the walls defining lower portion 118 of hole 114, as described above.

Figure 9:
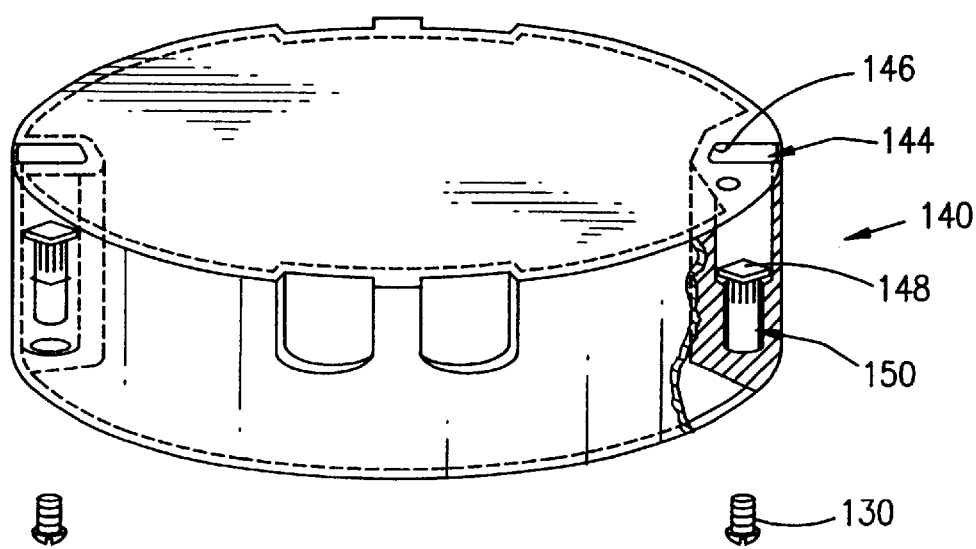
FIG. 9 is a perspective view of yet another preferred embodiment of a junction box according to the invention.

FIG. 9 illustrates another preferred embodiment of a junction box 140 according to the invention having a hole 144 defined therein.

Box 140 is similar to box 110 of FIG. 8; however, a hole 144 defined therein preferably has an upper portion 146 configured to mate with square head 148 of a fixture support 150.

Figure 10:
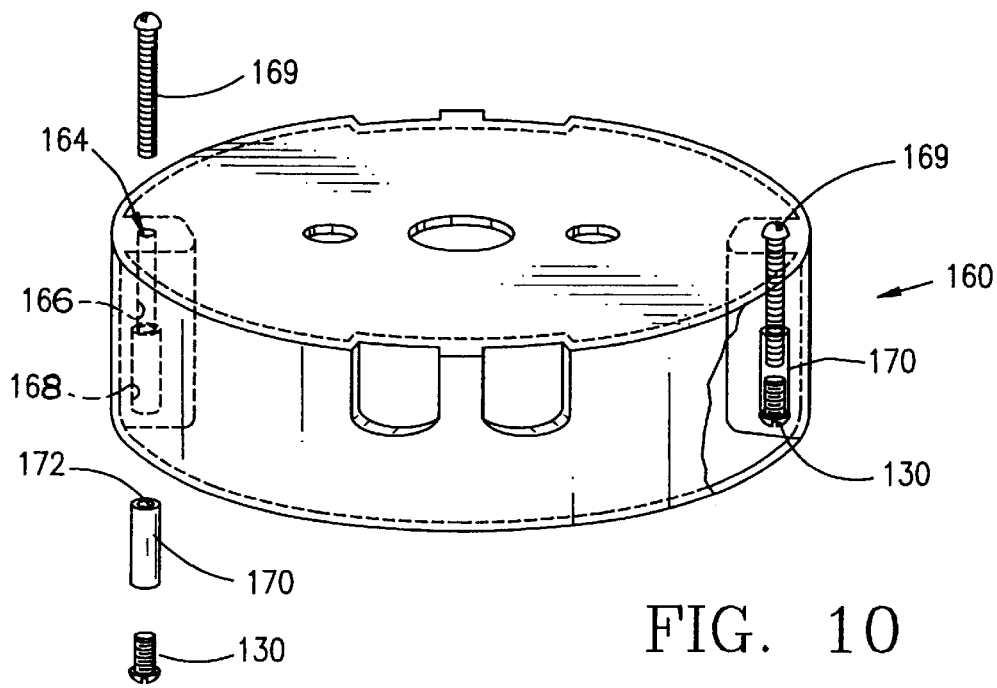
FIG. 10 is a perspective view of another preferred embodiment of a box according to the invention.
Figure 11:
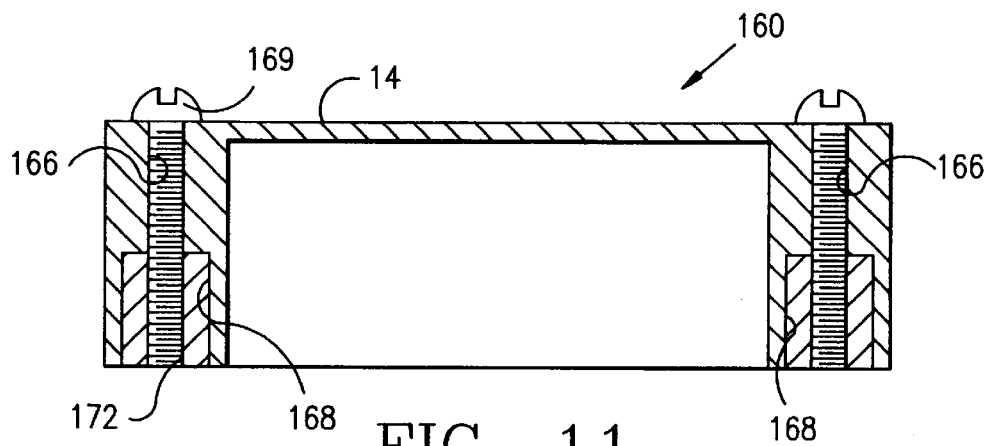
FIG. 11 is a cross-sectional view of FIG. 10.

Turning to FIGS. 10–11, yet another preferred embodiment of a junction box 160 according to the invention is shown.

Box 160 includes a hole 164 having an upper portion 166 and a lower portion 168.

A fixture support fastener 169 extends through upper portion 166 of hole 164 and engages with internal threads 172 of a fixture support 170. Depending on the intended use, internal threads 172 may be selected so as to mate with the external threads of both fixture support 169 and those of fixture fastener 130.

FIG. 11 is a cross-sectional view of junction box 110 of FIG. 10, after both fixture support fasteners 169 and fixture supports 170 have been installed in upper portion 166 and lower portion 168 of hole 164, respectively.

Figure 12:
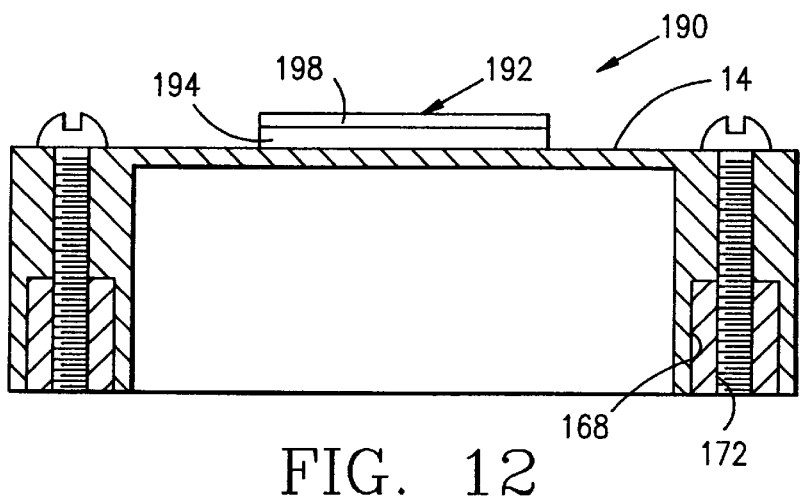
FIG. 12 is a cross-sectional view, similar to FIG. 11, of a further preferred embodiment of the invention.

FIG. 12 shows another preferred embodiment of a junction box 190 according to the invention.

Junction box 190 includes an adhesive 192, such as a piece of double-sided tape 194 on top wall 14 thereof. Double-sided tape 194 may be provided with a protective strip or layer 198 on the outer face thereof, i.e., on the face of double-sided tape 194 that has not been adhered to junction box 190. Conventional double-sided tape 194 may be used.

Alternative means for adhering junction box 190 to a surface may be used, such as spray-on adhesive, a piece of putty and other adhering means. Such adhesive may be as described in my earlier U.S. patent application Ser. Nos. 08/490,757, filed Jun. 15, 1995, and 08/371,695, filed Jan. 12, 1995, now U.S. Pat. No. 5,854,443, each of which is incorporated herein by reference, and such adhesive may be utilized in conjunction with or instead of the double-sided tape 194.

One of the many advantages of junction box 190 is that the user may remove protective layer 198, and then adhere double-sided tape 194 to the surface to which junction box 190 is to be attached. Double-sided tape 194 is selected and sized so that sufficient holding power for temporarily adhering junction box 190 to the surface is achieved, while the user has both hands free for permanently attaching junction box 190 in the desired location by nailing nails (or shooting screws) through one or more holes 36.

Preferably, the adhesive is sufficiently strong to adhere box 190 to a downwardly facing horizontal surface located above the user's head.

The thickness of double-sided tape 194 is coordinated with the thickness (i.e., height) of the head of bolt 169, as required, so that each performs its intended function, when junction box 190 is provided with screw 169 of FIGS. 10–11.

In a like manner, the height of the external portion of other supplemental supports will be coordinated with the thickness of adhesive material or double-sided tape 194. For example, when screw 169 is used with junction box 190, the thickness of double-sided tape 194 typically will be selected to be at least as high, and preferably in most cases, higher than such height.

Alternatively, when attaching box 190 to a stud having a width less than the distance between left and right screws 169, double-sided tape 194 need not extend away from top wall 14 a distance greater than the height of the heads of screws 169. That is because the stud would fit in between the offset left and right heads thereof.

Figure 13:
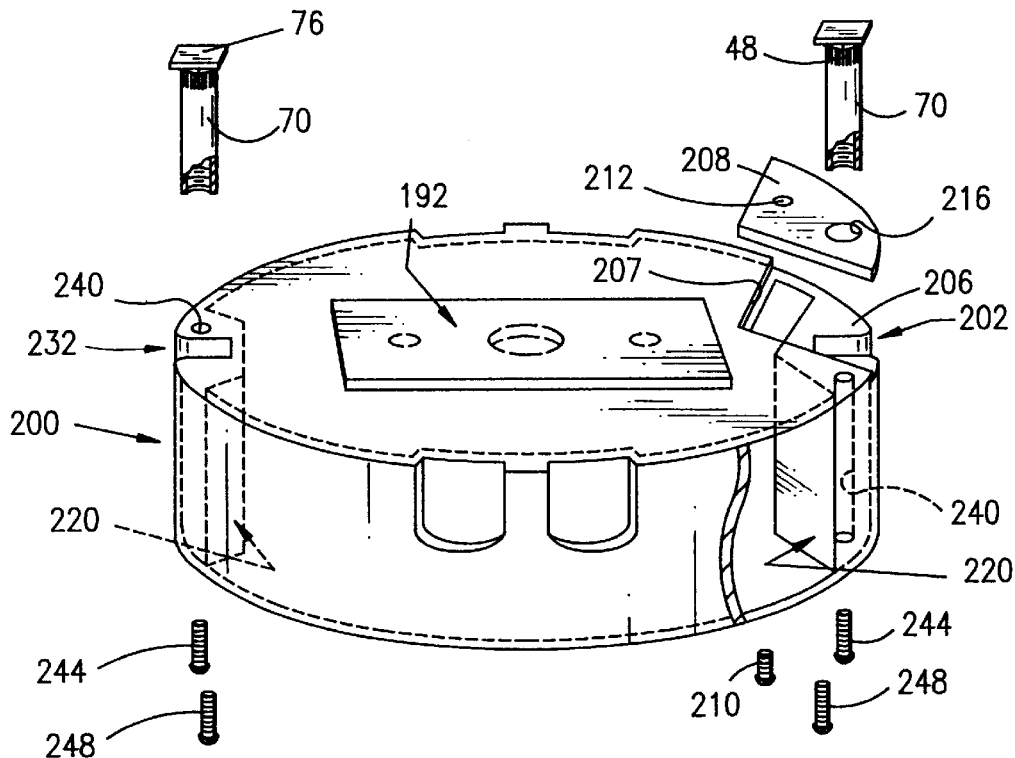
FIG. 13 is a perspective, exploded view of a further preferred embodiment of a junction box according to the invention.
Figure 14:
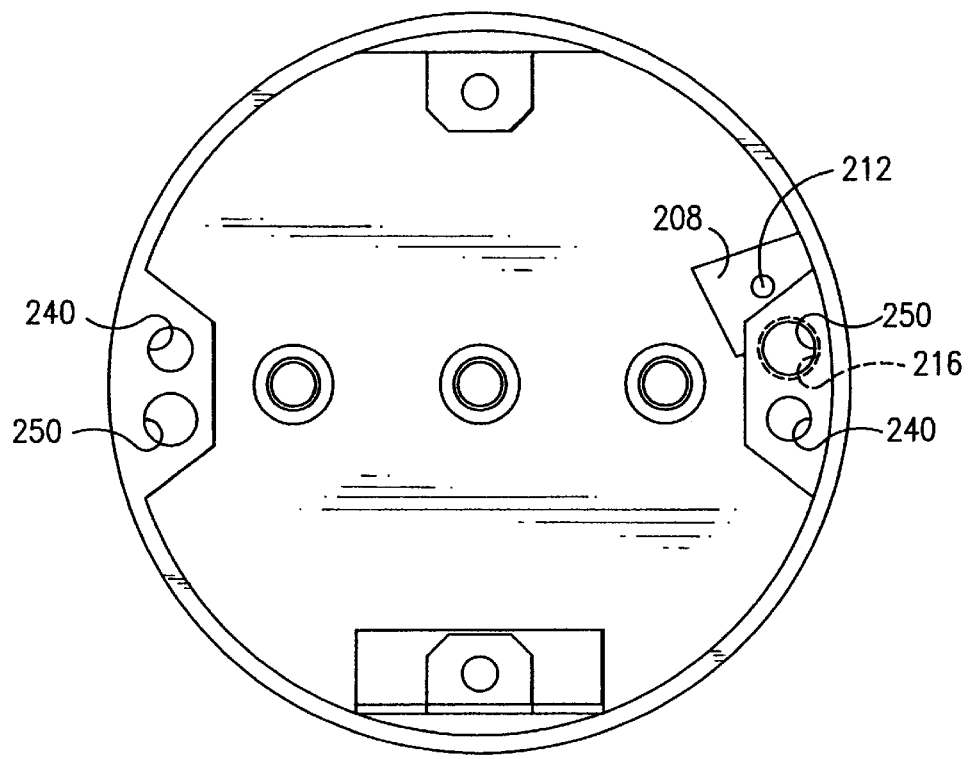
FIG. 14 is a bottom view of FIG. 13.

FIGS. 13 and 14 illustrate another preferred embodiment of junction box 200 according to the invention.

Junction box 200 includes a recessed portion 202 having a lower face 206 and a side face 207. Recessed portion 202 is preferably configured for receiving a mating metal plate or metallic element 208. Preferably, metal plate 208 is made of a material which can conduct electricity, and, hence, function as a part of the ground for the junction box, as will be described immediately herebelow.

Box 200 achieves the long-felt need for a plastic junction box which has its own ground. Such grounding is provided by a ground screw 210 securing the third or ground wire of standard alternating current (AC) wiring which has a positive wire, a negative wire, and a third, smaller and generally unsheathed grounding wire. Such grounding wire is secured to metal plate or grounding plate 208 by screwing a ground screw 210 into a threaded hole 212 defined therein.

Metal plate 208 may be secured to in recess 202 by the use of a through hole or opening 216. Fixture fastener 70, as described in various embodiments above, extends through hole 216 and is secured in extension 220 owing to fluting 48 engaging one or both of plate 208 and hole 250, for example. Thus, the problem of easily lost prior art metal add-ons or clips on prior art boxes has been solved.

In this embodiment, a further recessed portion or "window" 232 is provided so that the user can see installed fixture support 70, in a manner similar to that described above regarding FIG. 7. A seat 104 of FIG. 7 is optional in window 232.

When box 200 is assembled, ready for use, a fixture, such as a ceiling fan can be secured by use of a ceiling fan fastener, along the lines described above. Needless to say, ceiling fan fastener is typically made of metal, and engages metal portions of the ceiling fan housing.

Hence, when the ceiling fan has been installed, and the wiring is completed, a ground will have been established through the ceiling fan housing, then through fastener 244, then through fixture support 70, through grounding plate 208, and through the grounding wire secured to grounding plate 208 by grounding screw 210. Thus, applicant has realized his goal of providing a plastic junction box having its own grounding.

Fixture support 70 extends through hole 216, through window 232, and into a hole 250. Fluting 48 has a length selected so as to engage at least the interior faces of opening 232, if not hole 216, shown as being slightly oversized to allow free passage of fluting 48 therethrough. It is contemplated that hole 216 be sized so as to engage metal plate 208; i.e., the inner walls of 216.

In addition to the benefits of functioning as a grounding element, grounding plate 208 further increases the carrying strength of junction box 200 owing to the forces transmitted through head 76 of fixture support 70.

It is contemplated that hole 240, sized to receive conventional light fixture fasteners 248, shown with the conventional rounded heads thereon, be provided with internal, plastic threads, as desired. By the use of internal plastic threads, self-tapping screws need not be used as light fixture fasteners 248.

Another important result of the embodiment of FIG. 13, as well as each of the embodiments of FIGS. 14–18, and 19–30, is the realization of the use of a larger proportion of less costly and more environmentally-friendly plastic material, with a reduced proportion of metal elements, so as to save on production and energy cost, and reduce the shipping weight which further reduces energy cost and, ultimately, the cost to producers and consumers.

FIG. 15 illustrates another preferred embodiment of the invention, similar to the embodiment of FIGS. 13–14, with the provision of a fastener 40 of the type described above having a round head 46. Junction box 260 may include the optional adhesive 192, such as the illustrated double-sided tape. Light fixture fasteners 248 have been omitted for clarity.

FIG. 16 illustrates a junction box 270 according to another preferred embodiment of the invention.

Box 270 may include a fixture support of the type described above regarding FIG. 10, for example, having fixture support fastener 169 extending through hole 164 and engaging internal threads of fixture support 170. Fixture support 170 has internal threads mating with fixture fastener 130, as described above.

FIG. 16A illustrates an optional grounding plate 278 for use with box 270 of FIG. 16. Metal plate or grounding plate 278 includes a threaded hole 282 for receiving a grounding screw, as described above, as well as a through hole 284 through which fixture support fastener 169 extends when grounding plate 278 is used. Hole 284 need not be threaded.

It is likewise contemplated that an additional hole be provided in a region 274 of extension 276 of FIG. 16, so that a second type of fixture fastener may be used on the same junction box, such as in the embodiment of FIGS. 13–15, for example.

Figure 17:
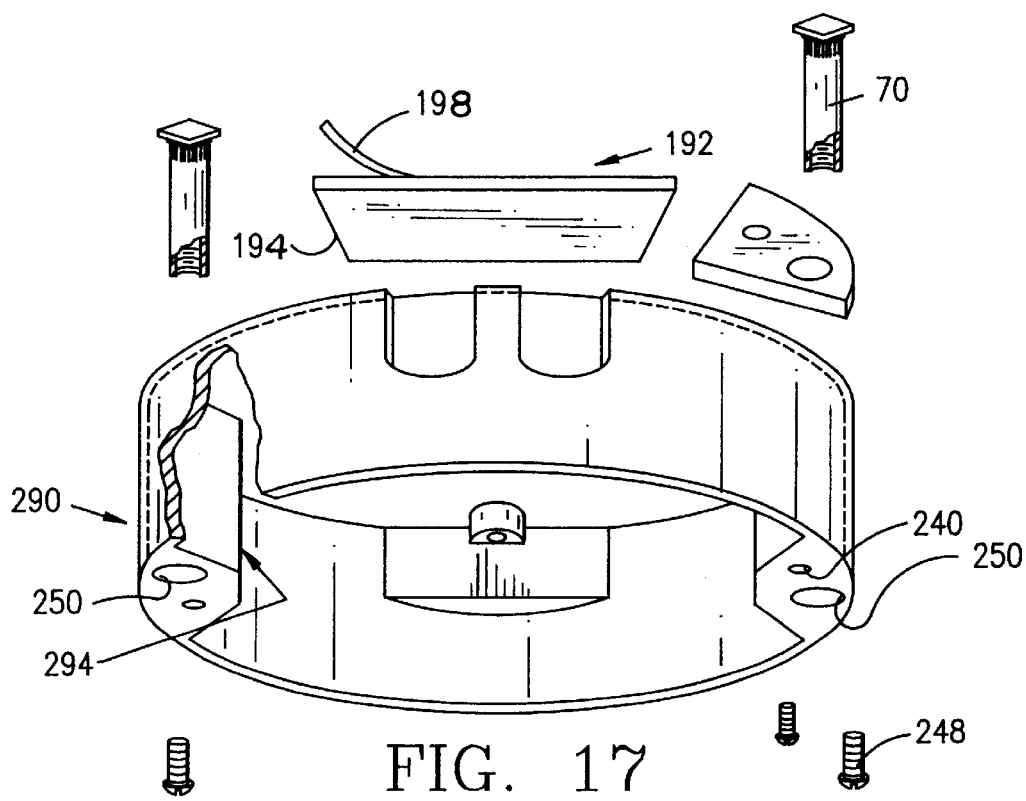
FIG. 17 is a perspective, exploded view, taken from below, of yet another preferred embodiment of a box according to the invention.

FIG. 17 illustrates another preferred embodiment of a junction box 290 according to the invention. Junction box 290 is similar to the embodiment of FIG. 13; however, there is no window 232. Adhesive 192, such a double-sided tape, is shown in the exploded view to emphasize that adhesive 192 is optional. Protective layer 198 has been partially peeled away from double-sided tape 194, as such would be done immediately prior to adhering assembled junction box 290 to a surface, such as the side of a wall stud, or to the lower face of a ceiling joist.

Figure 18:
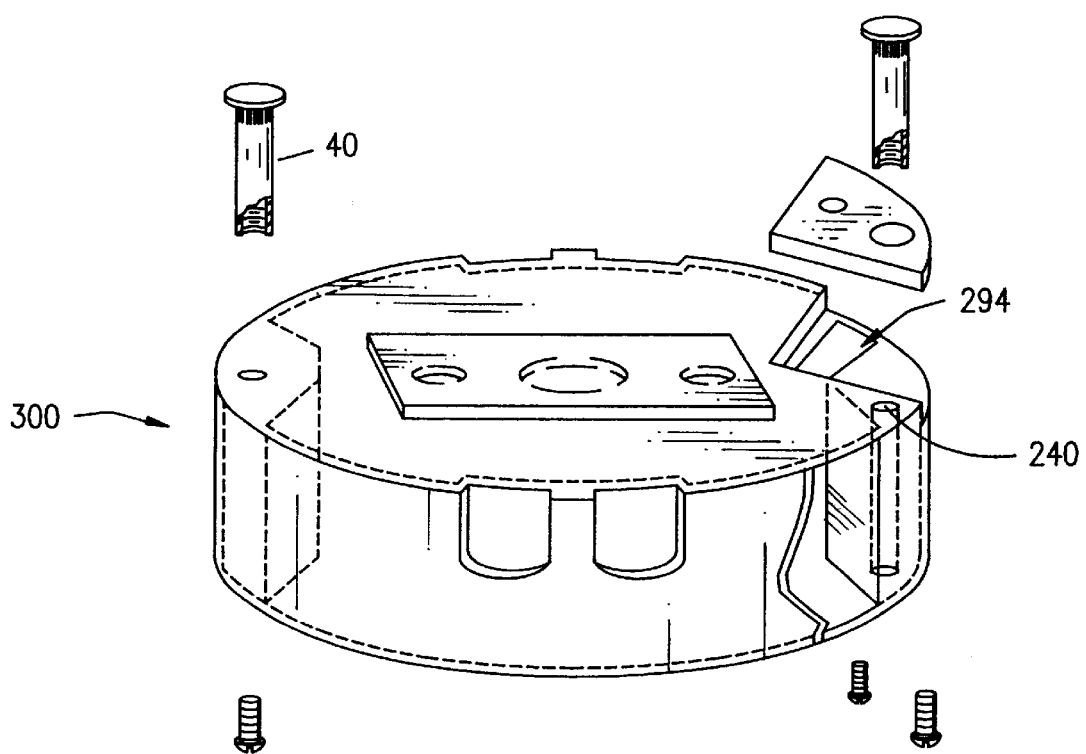
FIG. 18 is a perspective, exploded view of a junction box according to yet another preferred embodiment of the invention.

FIG. 18 shows a junction box 300 which has round headed studs 40, and has no window 232 in its extension 294, unlike the similar junction box of the embodiment of FIG. 15.

Figure 19:
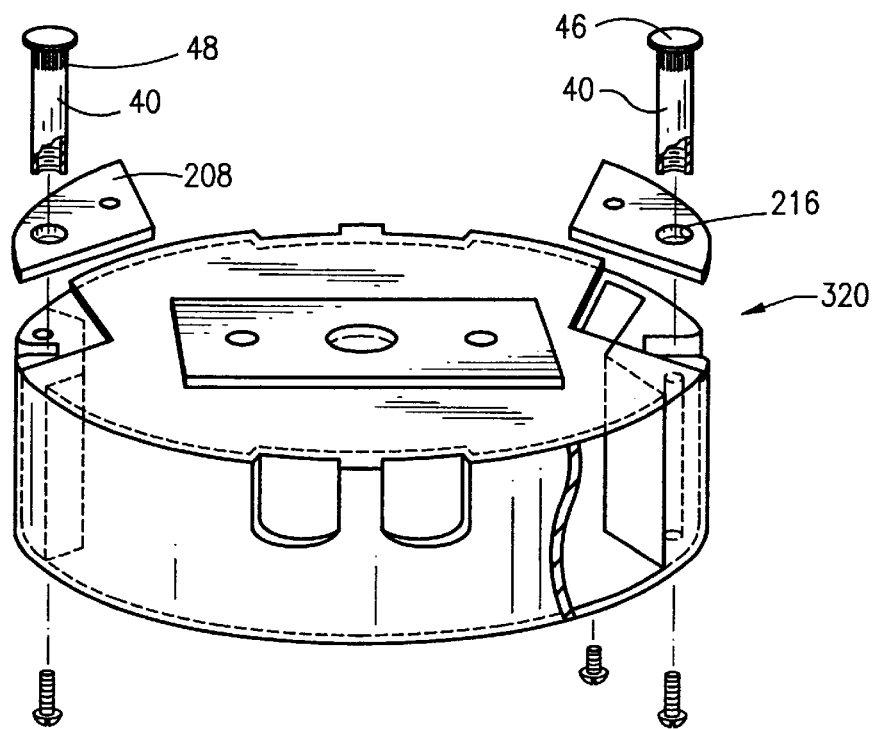
FIG. 19 is an exploded, top perspective view of a further preferred embodiment of a junction box according to the invention.

FIG. 19 shows another preferred embodiment of the invention, similar to the embodiment of FIGS. 13–14, and that uses fastener 40 of the above-described type having round head 46. As with the above embodiments, the engagement of fluting 48 with opening 216 in reinforcing plate 208 prevents relative movement of support 70 in all directions relative to plate 208 and, hence, the remainder of box 320. Junction box 320 has reinforcing plates 208 for each one of supports 70, unlike junction box 260 of FIG. 15. Thus, support 40 goes through metal plate 208 for extra support.

Figure 20:
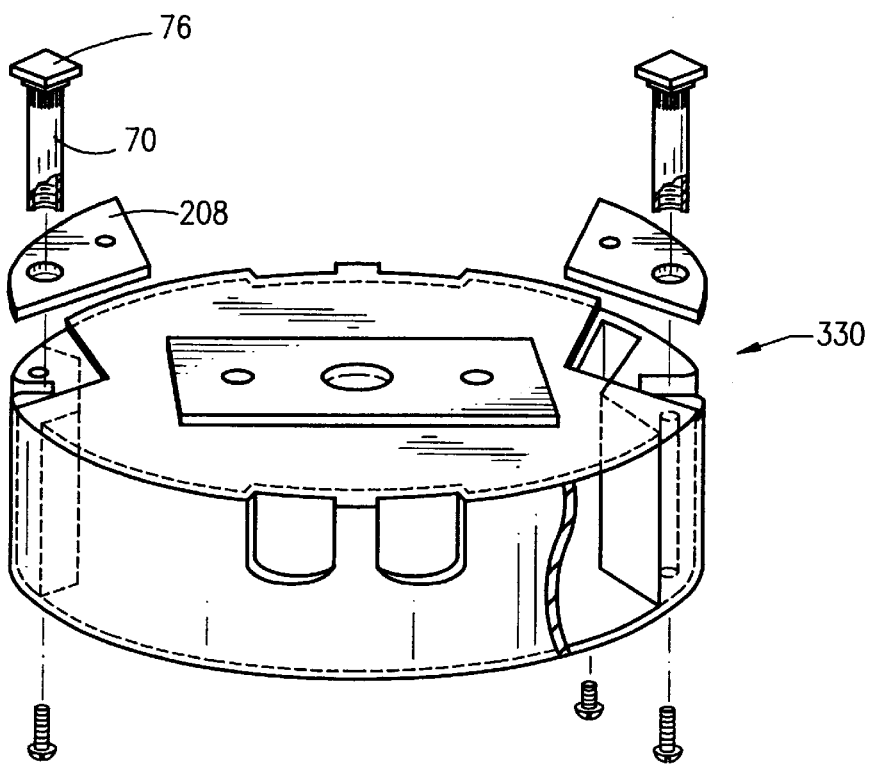
FIG. 20 is an exploded, top perspective view of a further preferred embodiment of a junction box according to the invention.

FIG. 20 shows another preferred embodiment of a junction box 330 according to the invention. Junction box 330 includes a pair of fixture supports 70 of the type having square heads 76, and both sides of junction box 330 have respective reinforcing plates 208 for enhancing the carrying strength of box 330, along the lines described regarding junction box 200 of FIG. 13 above, for example.

Both junction box 320 of FIG. 19 and junction box 330 of FIG. 20 have extra support for heavy duty applications, such as supporting ceiling fans, chandeliers, and heavy light fixtures, for example.

Figure 21:
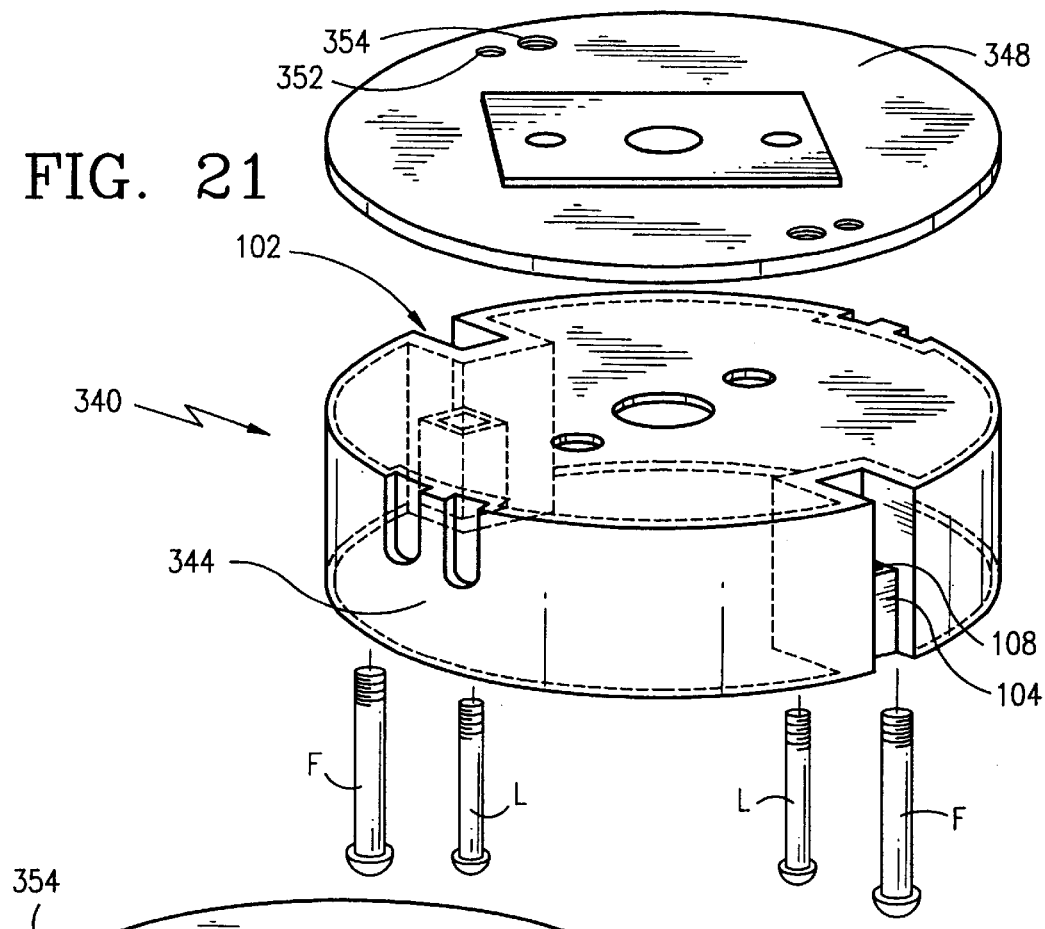
FIG. 21 is an exploded, top perspective view of a further preferred embodiment of a junction box according to the invention.

FIG. 21 illustrates yet another preferred embodiment of a junction box 340 according to the invention. Box 340 includes a base 344 and a top 348.

Base 344 may include recess or seat 102 therein having a seat 104 in which opening 108 is provided, such as described in connection with box 100 of FIG. 7 above.

Top 348 may be provided with one or more openings or holes therein, such as a first opening 352 and a second, typically spaced apart, threaded opening 354.

Hole 352 may be used for securing a light duty fastener, such as illustrated fastener L. Likewise, hole 354 may be sized for receiving a heavy duty fastener, such as illustrated fastener F.

In use, when a light fixture is to be supported, fasteners L will be mated with the intended portions of a light fixture, for example, inserted into the lower portion of opening 108, out through the top of opening 108, through recess 102, and into engagement with threaded hole 352. Typically, a pair of fasteners L would be used to support a light fixture. Opening 108 may be sufficiently large to receive fasteners L and F.

Junction box 340 of FIG. 21 is particularly suited for heavy duty applications and/or for applications where a stable top portion 348 is desirable. Base 344 may be made of a non-metallic material or of variety of plastics, and top portion 348 may be made of the same material as base 344 or of a metal, for example.

Box 340 may be shipped and retailed with one or both of fasteners L and F secured in respective hole 352 and 354. In that manner, the customer would be able to see the strength of fasteners L and F, as well as to be assured that the fasteners had been provided along with box 340.

Figure 22:
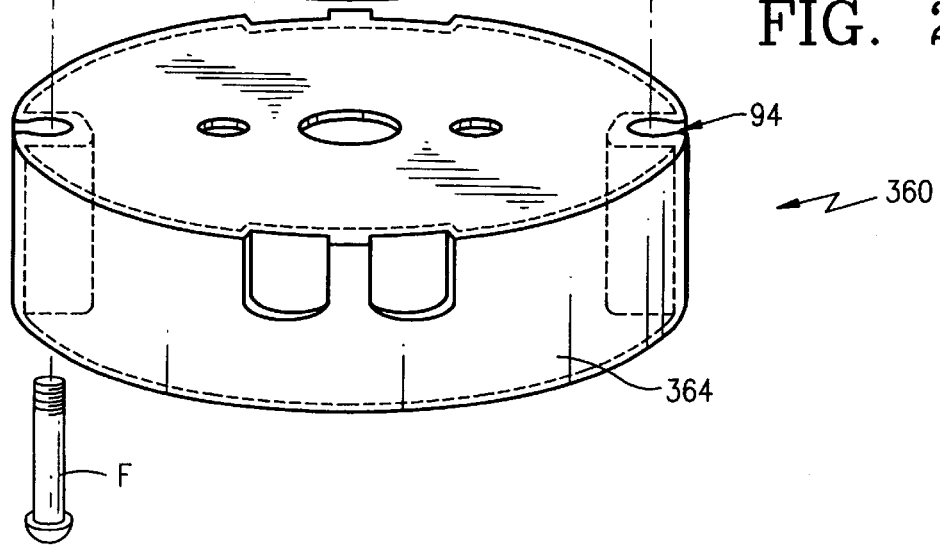
FIG. 22 is an exploded, top perspective view of a further preferred embodiment of a junction box according to the invention.

FIG. 22 illustrates another preferred embodiment of a junction box 360 according to the invention. Box 360 includes a base 364, which may be fixedly attached or separate from a top portion 368.

Base 364 may be similar to box 90 of FIG. 6, described above. For example, opening 94 may be provided through which fastener F will extend and engage with hole 354 in top portion 368 during shipment, as desired, and during use. When top portion 368 is metal, fastener F engage metal.

Figure 23:
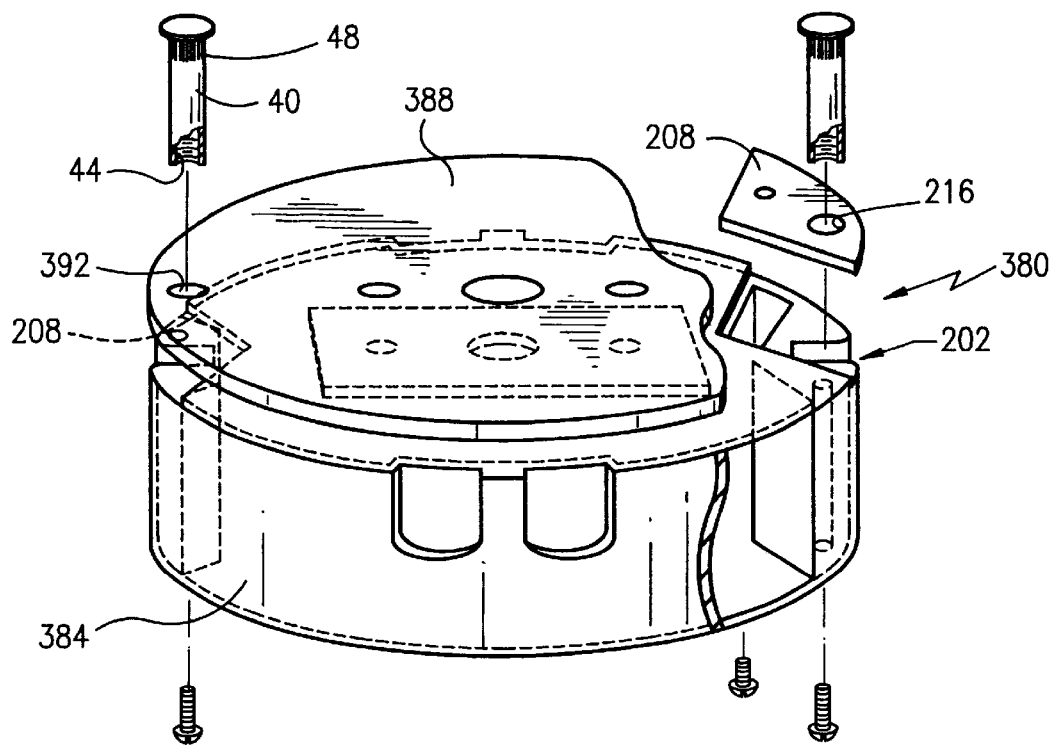
FIG. 23 is an exploded, top perspective view of a further preferred embodiment of a junction box according to the invention.

FIG. 23 illustrates another preferred embodiment of a mounting assembly or junction box 380 including a base 384 and a top portion 388. Base 384 may be made in a manner similar to junction box 200 of FIG. 13, and may include recessed portion 202 as described above. Junction box 380 is particularly well suited for extra heavy duty installations, such as for heavy ceiling fans and chandeliers, and may be provided with plates 208 on each side of base 384 in addition to top portion 388, which further strengthens box 380.

An opening 392, which may be in the form of a hole, may be provided in top portion 388. Fixture support 40 may extend through both opening 392 in top portion 388 and opening 216 in plate 208. In that case, fluting 48 of fastener 40 may be configured and size for engaging both opening 392 and opening 216 for fixedly securing the various components together and for strengthening and rigidifying the connection of fixture support 40 to remainder of box 380. It is likewise contemplated that, depending on the intended use, one or both of openings 392 and 216 may be sized so that knurling 48 does not engage therewith.

Figure 24:
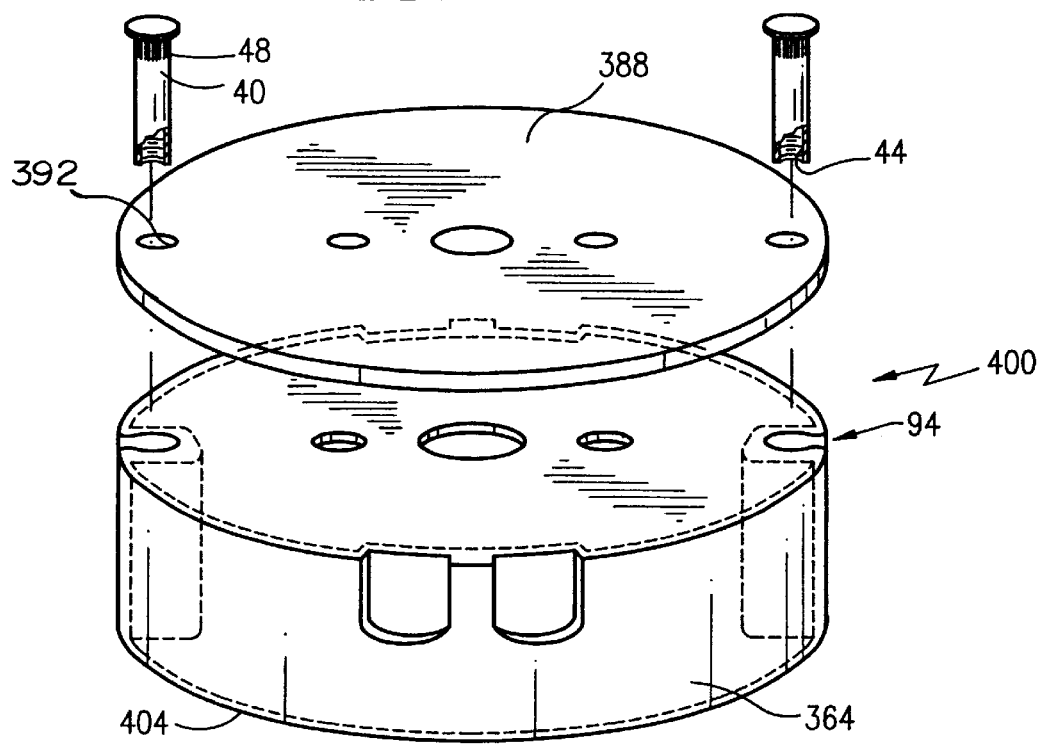
FIG. 24 is an exploded, top perspective view of a further preferred embodiment of a junction box according to the invention.

Turning to FIG. 24, another preferred embodiment of a junction box 400 according to the invention is shown. Junction box 400 may include base 364 having one or more recesses 94 therein, as in the junction box 360 of FIG. 22, for example.

Likewise, top portion 388 having opening or hole 392 therein may be provided, as described immediately above regarding junction box 380 of FIG. 23. In this case, fixture supports, such as the illustrated fixture support 40 having fluting 48 thereon may typically extend through opening 392 and into and through opening 94. Fluting 48 may or may not engage the inner wall of opening 392, depending on the intended use.

Fixture support 40 may extend past a lower free edge 404 of junction box 400, depending on the intended use. Fasteners 40 may likewise be selected so as to be sufficiently short so that the lower portion (e.g., the portion including female fasteners 44) of supports 40 are disposed completely above lower free edge 404.

As will be readily appreciated, junction box 400 is suited for light and heavy duty applications.

Figure 25:
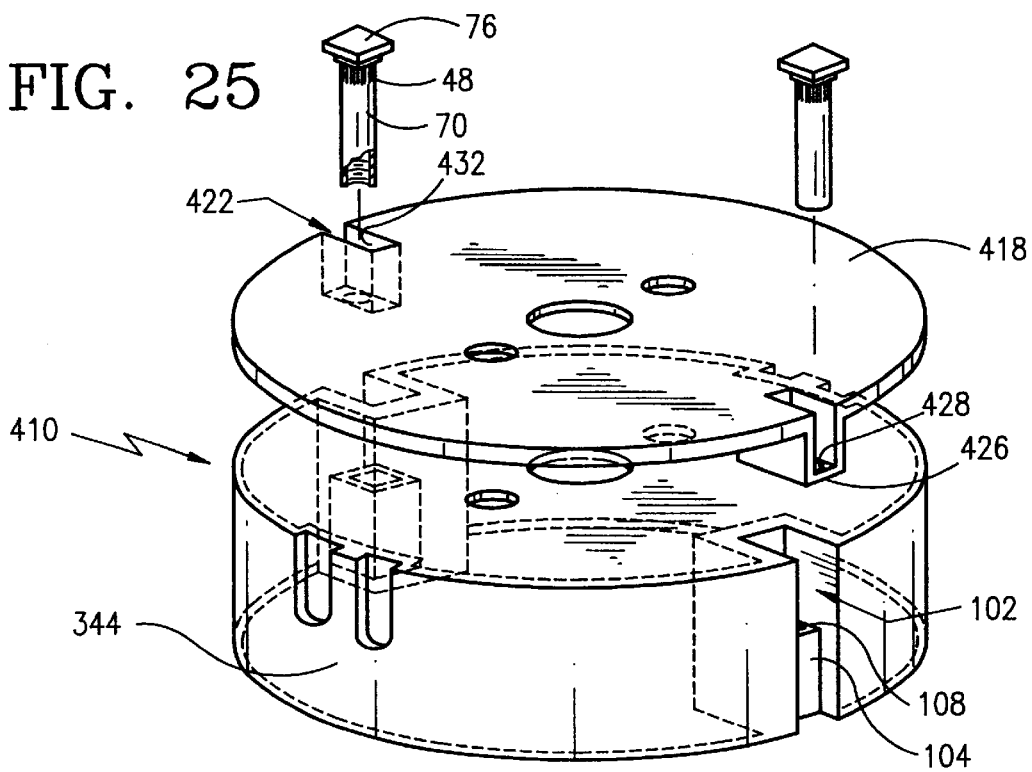
FIG. 25 is an exploded, top perspective view of a further preferred embodiment of a junction box according to the invention.

FIG. 25 illustrates a further preferred embodiment of a junction box 410 according to the invention.

Junction box 410 may include a base 344 of the type described above as well as a top portion 418 for strengthening box 410. Top portion 418 may include a stepped portion 422 having a lower wall 426 with an opening, such as a hole 428 therein. Wall 426 may be configured for being seated on seat 104 so that opening 428 is substantially aligned with opening 108. In that manner, fixture support 70 may be inserted into recess 422, through opening 428, opening 108, and inserted sufficiently far so that fluting 48 engages one or both of the inner walls 428 and 108. It will be appreciates that square head 76 may likewise be sized so as to engage the inner walls 432 of recess 422 in order to further resist rotational, transverse, and longitudinal movement of fixture support 70 relative to the remainder of junction box 410.

Figure 26:
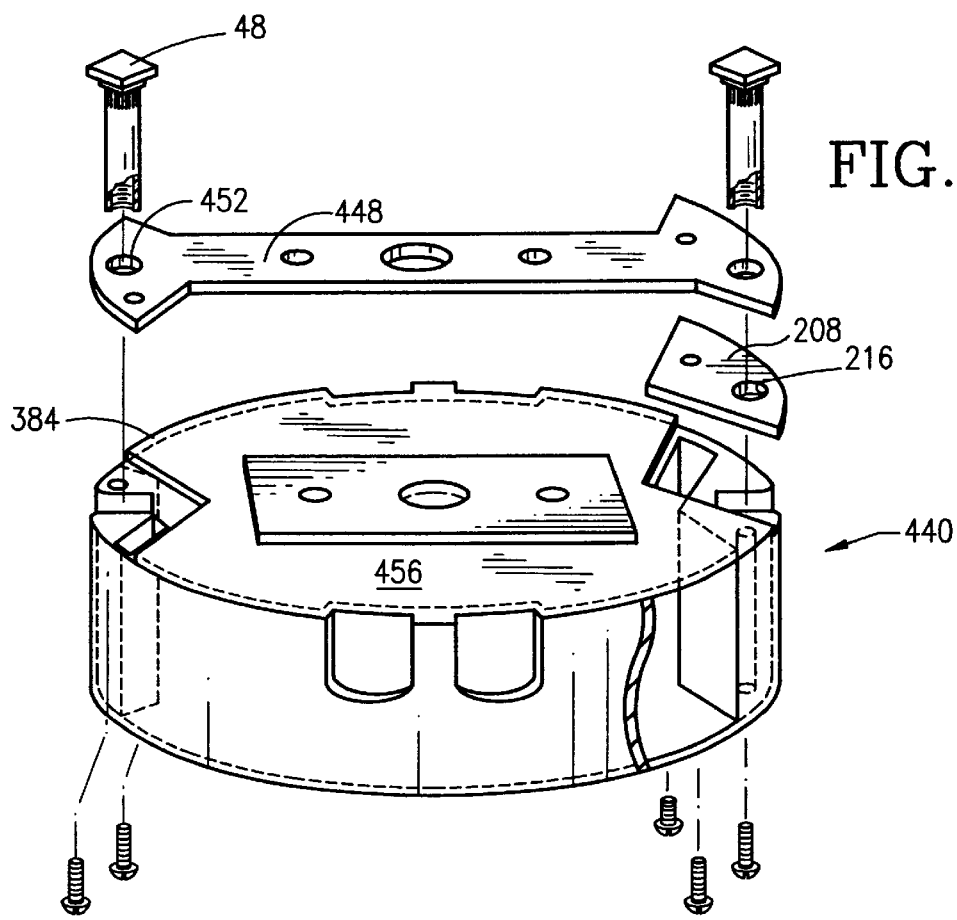
FIG. 26 is an exploded, top perspective view of a further preferred embodiment of a junction box according to the invention.

FIG. 26 illustrates a further preferred embodiment of a junction box 440 according to the invention. Junction box 440 may include a base 384 as in the embodiment of FIG. 23 and one or more plates 208 disposed between base 384 and a top portion 448. As in the above described embodiments, fluting 48 may engage the respective inner walls of one or both of an opening or through hole 452 in top portion 448 and opening or hole 216 in plates 208.

Junction box 440 is suited for applications where top portion 448, which may be made of a metal, need not cover the entire top surface 456 of base 384.

Figure 27:
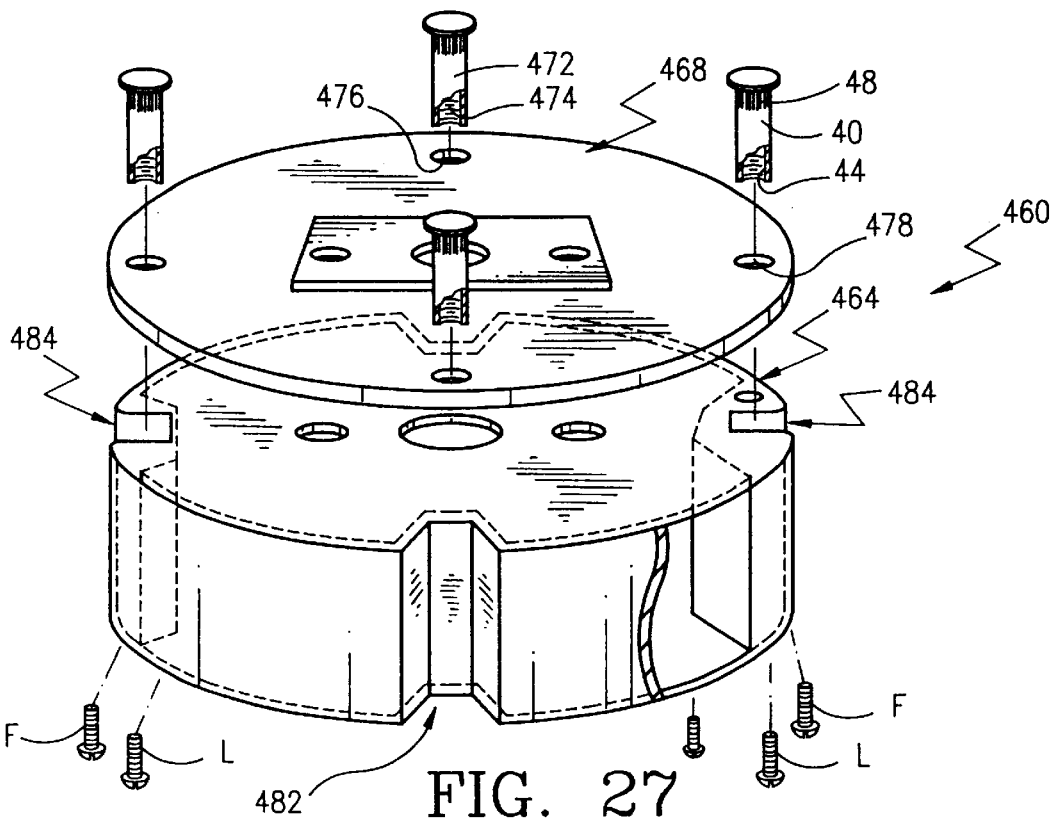
FIG. 27 is an exploded, top perspective view of a further preferred embodiment of a junction box according to the invention.

FIG. 27 shows another preferred embodiment of a junction box 460 according to the invention.

Junction box 460 includes a base 464 and a top portion 468.

Box 460 is similar to box 400 of FIG. 24, yet with the provision of a four(4) corner support system. Namely, four(4) fixture supports are placed at different placement or locations around box 460. Typically, there may be a spaced apart pair of fixture supports 40 having threads 44 and fluting 48, as described above for receiving a first type of fixture fastener such as a 10–32 fastener F. In addition, there may be provided a second pair of spaced opposed fixture support 472 having female fasteners 474, for example, thereon. Typically, fasteners 474 will differ from fastener 44, so that a different type of fastener may be supported. For example, fastener 474 may be 8–32 threads for receiving corresponding male threads of a light fixture fastener L therein, when junction box 460 is used for supporting a light fixture.

In this manner, junction box 460 may be used for either supporting a light fixture or a ceiling fan or chandelier, for example. Thus, the invention has provided for two(2) junction boxes in one.

Figure 28:
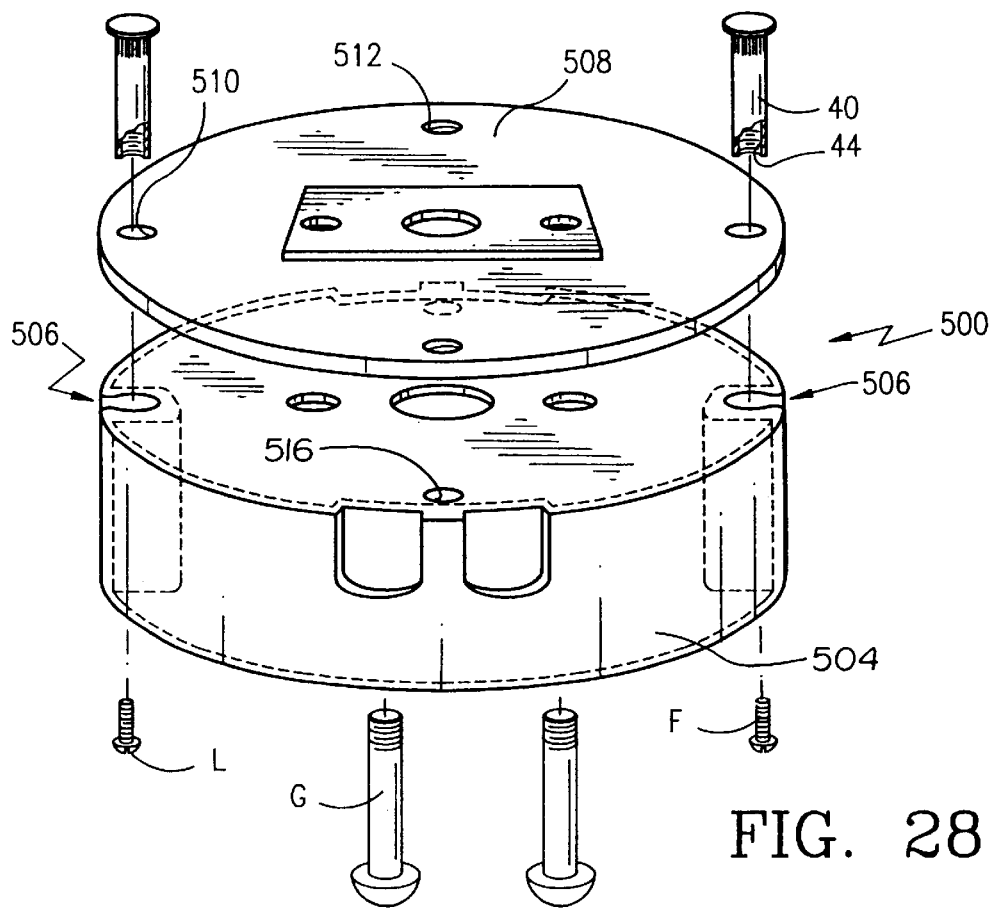
FIG. 28 is an exploded, top perspective view of a further preferred embodiment of a junction box according to the invention.

FIG. 28 illustrates a further preferred embodiment of a junction box 500 according to the invention. Junction box 500 includes a base portion 504 having a recess 506 therein, and a top portion 508.

Top portion 508 may be provided with one or more openings or holes 510 therein, as well as one or more openings 512 therein. As illustrated, opening 510 may be sized for receiving a fixture support 40 therethrough. Opening 512 may be provided with threads and may be aligned with a further one or more openings 516 in base portion 504.

In use, when top portion 508 is disposed on base 504, fixture supports 404 will be insert through openings 510 and into opening or recesses 506. When openings 512 are aligned with openings 516 in base 504, one or more fixture fasteners G may be inserted from below up through opening 516 and threadedly secured with holes 512. Fasteners G are used with fixtures of the type that require such, and fasteners 44 on fixture supports 40 are used with fasteners that require such. It is expected that junction box 500 be used for light duty or heavy duty applications of the type that require fasteners G and/or fasteners F.

Junction box 500 provides for metal to metal support when top portion 508 is metal and fixture supports 40 are metal. When top portion 508 is metal, opening 512 may be tapped into the metal or fasteners G may be self-tapping screws, for example.

Figure 29:
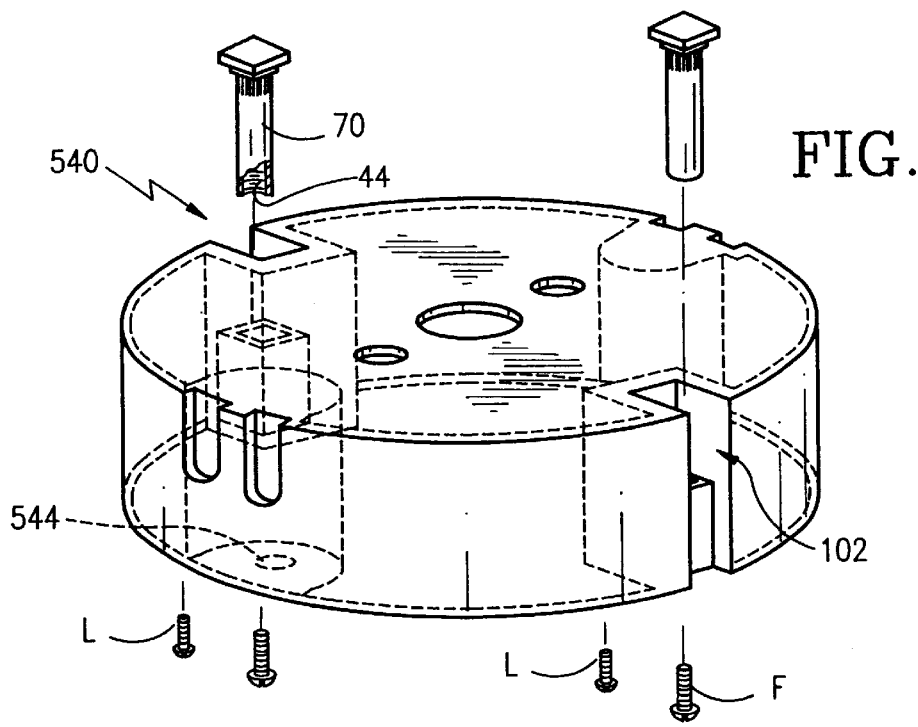
FIG. 29 is an exploded, top perspective view of a further preferred embodiment of a junction box according to the invention.

Turning to FIG. 29, a further preferred embodiment of a junction box 540 is shown of the type having four(4) supports. Namely, two(2) types of paired supports.

Junction box 540 includes one or more tapped holes 544 therein, preferably for receiving fasteners L of the type having 8–32 threads for supporting standard light fixtures. Box 540 may be made of fiber glass, other non-metallic materials, or plastics.

One or more fixture supports 70 having fasteners 44 may likewise be provided in respective recessed portions 102 as described above. Box 540 is a two-in-one type box useful for supporting, alternately, light duty or heavy duty fixture, as will be readily appreciated.

Figure 30:
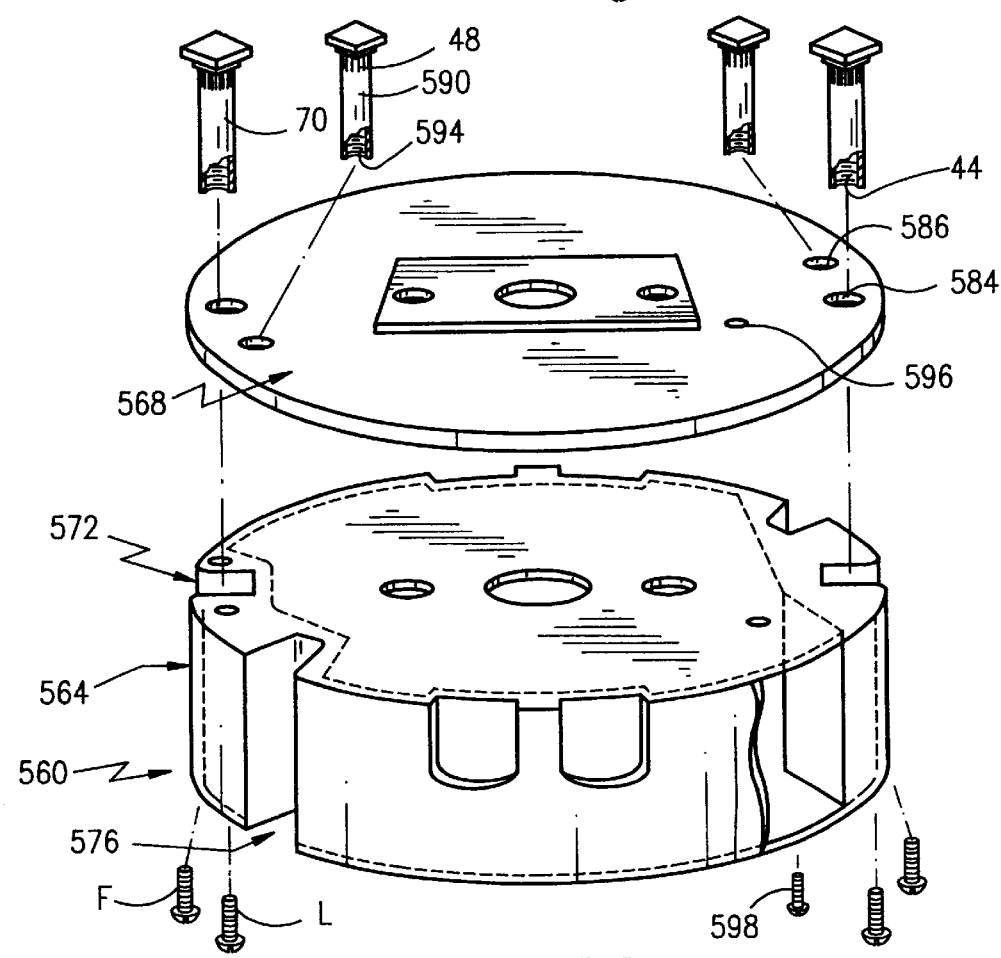
FIG. 30 is an exploded, top perspective view of a further preferred embodiment of a junction box according to the invention.

FIG. 30 shows a further preferred embodiment of a junction box 560 according to the invention. Junction box 560 includes a base 564 and a top portion, such as a metal plate 568. Base 560 may be made of fiber glass reinforced plastic, non-metallic materials, or plastics, for example. One or more first recesses 572 and second recesses 576 may be provided in base 560. The location of recesses 572 and 576 are typically selected so that opposed pairs are provided for securing different type of ceiling fixtures as will be discussed immediately below. Junction box 560 is similar to junction box 460 of FIG. 27 yet with the opposed, paired fixture supports 572 and 576 located substantially adjacent each other.

Top portion 568 includes one or more openings for hole 584 and one or more opening 586 therein. Openings 584 are sized for receiving fixture support 70 therein, and openings 586 are sized for receiving fixture support 590 therein. Fixture support 590 may be provided with threads 594 of a different size from threads 44 of support 70, so that the user has two(2) boxes in one.

In use, top portion 568 is disposed on base 560, and fixture supports 70 and 590 extend through respective ones of openings 584 and 586, and then through respective ones of openings 572 and 576.

A further opening 596 such as a threaded hole, may be provided in top support 568 and sized for receiving a fastener 598 therein, such as grounding screw.

When top support 568 is metal, all fasteners are supported by metal.

It will be appreciated that all the above-described embodiments may be partially or fully assembled at the factory and the various exploded views are shown for ease of understanding.

VARIATIONS

It is contemplated that the lengths of all the fixture supports, such as fixture support 40, 70, and 590 may be varied so that the lower portions thereof extend outwardly of the respective bases of the various junction boxes, or are disposed completely with fitted junction boxes, such as by being recessed within junction boxes, depending on the intended use.

As to the fixture supports, such as the illustrated supports 40, 70, and 90, and so forth it is likewise contemplated that such supplemental supports will have other cylindrical shapes, hexagonal-shapes, square shapes, and shapes which are tapered at an upper portion thereof. In addition, frustrums of pyramids and the other shapes are contemplated with truncation taken at angles other than the illustrated angles and removed portions, and other than the illustrated substantially right angle between the top face of respective supplemental supports of upper wall 14 of the various preferred embodiments of the junction box according to the invention. The length of the fixture supports will be varied depending on the intended use and depth (height) of the box, as required.

It is contemplated that fixture supports 40, for example, be provided in opposed pairs, as shown, for attaching a first type of fixture, such as a ceiling fan; and, on that same box, a second pair of opposed fixture supports 40 have the same or different threads from the first pair will be provided. That second pair of fixture supports 40 may be provided adjacent to or spaced from the first pair. For example, it is contemplated that a spaced apart pair of fixture supports be located adjacent the box side wall and each fixture support being between the first pair of spaced apart fixture supports. In other words, FIG. 2 shows two(2) supports 40 which may be considered to be located at the free ends of a negative ("–") sign. Two(2) additional fixture supports 40 may be added, whereby four(4) are present, one(1) of which is located at each of the four(4) free ends of a plus ("+") sign. The second pair would typically have a different thread size at the lower ends thereof, as compared with the first pair, so that one pair supports light fixtures, and the other pair supports ceiling fans, for example.

In addition to the screws used in the embodiments described above, it is expected that bolts or locking coupling nuts will be used to attach supplemental supports to the junction box, as well as any other means of fastening supplemental supports to the junction box in a sufficiently secure manner so as to achieve the objects of the invention.

It will be appreciated that these are merely examples of solutions to the problems set forth in my accompanying drawings and description, and, taken in its entirety, it will be appreciated that all the above objects of the invention, as well as many others, have been fulfilled.

It will likewise be appreciated that all the components described in the foregoing can be made of a variety of materials, such as steel, zinc, non-metallic materials, or nylon, and other plastics, as the producer and user demand. For example, the box and/or the top portion and/or the fixture support may be made of non-metallic materials, or plastic or both made of metal, or the box may be made of metal and the fixture support made of non-metallic materials, or plastic, for example.

While this invention has been described as having a preferred design, it is understood that it is capable of further modification, uses and/or adaptations following in general the principle of the invention and including such departures from the present disclosures as come within known or customary practice in the art to which the invention pertains, and as may be applied to the essential features set forth, and fall within the scope of the invention or the limits of the appended claims.

I claim:

1. A mounting assembly, comprising:
   a) junction box including a top wall and a side wall;
   b) said side wall extending downwardly away from said top wall and defining a cavity therein;
   c) a fixture support being provided on said junction box; and
   d) said fixture support being disposed outside said cavity adjacent to said side wall.

2. A mounting assembly as defined in claim 1, wherein:
   a) said junction box comprises a non-metallic material.

3. A mounting assembly as defined in claim 1, wherein:
   a) said fixture support includes at least two fixture supports.

4. A mounting assembly as defined in claim 1, wherein:
   a) said fixture support includes an outwardly extending portion which engages said top wall of said junction box.

5. A mounting assembly as defined in claim 1, wherein:
   a) a plate is provided on said top wall; and
   b) said fixture support engages said plate.

6. A mounting assembly as defined in claim 5, wherein:
a) a friction surface is provided between said fixture support and said plate, said friction surface being configured for substantially preventing relative movement between said fixture support and said plate.

7. A mounting assembly as defined in claim 6, wherein:
a) said friction surface includes knurling.

8. A mounting assembly as defined in claim 5, wherein:
a) said plate comprises metal and said top wall and side wall comprise a non-metallic material.

9. A mounting assembly as defined in claim 1, wherein:
a) said fixture support comprises metal.

10. A mounting assembly as defined in claim 1, wherein:
a) said junction box comprises plastic.

11. A mounting assembly as defined in claim 1, wherein:
a) said fixture support includes a stud having a head at a top portion thereof; and
b) said head engages said top wall of said box.

12. A mounting assembly as defined in claim 1, wherein:
a) said fixture support has a square head thereon; and
b) said square head engages said junction box.

13. A mounting assembly as defined in claim 12, wherein:
a) said square head is disposed below said top wall of said box.

14. A mounting assembly as defined in claim 11 wherein:
a) said fixture support has a round head; and
b) said round head engages said junction box.

15. A mounting assembly as defined in claim 1, wherein:
a) an adhesive is disposed on said top wall; and
b) said adhesive is located and sufficiently strong for securing said junction box to a support surface.

16. A mounting assembly as defined in claim 15, wherein:
a) said adhesive includes double-sided tape.

17. A mounting assembly as defined in claim 1, wherein:
a) said fixture support is directly adjacent said junction box.

18. A mounting assembly as defined in claim 1, wherein:
a) said fixture support is sized for engaging a first type of fixture fastener.

19. A mounting assembly as defined in claim 18, wherein:
a) said fixture support includes a second fixture support, and said second fixture support is sized for receiving a second type of fixture fastener.

20. A mounting assembly, comprising:
a) a junction box including a top wall and a side wall;
b) said side wall extending downwardly away from said top wall and defining a cavity therein;
c) a fixture support being provided on said junction box;
d) an indentation being provided on said junction box adjacent to side wall; and
e) said fixture support being disposed in said indentation.

21. A mounting assembly as defined in claim 20, wherein:
a) said indentation includes an open face, said open face being sufficiently large so that a portion of said fixture support is visible through said open face.

22. A mounting assembly as defined in claim 21, wherein:
a) said open face faces away from said cavity of said junction box.

23. A mounting assembly as defined in claim 20, wherein:
a) said indentation includes at least two indentations; and
b) said fixture support includes at least two fixture supports and at least one of said two fixture supports is disposed within each said at least two indentations.

24. A mounting assembly as defined in claim 20, wherein:
a) said indentation includes at least four indentations;
b) said fixture support includes at least four fixture supports and at least one fixture support is disposed within each said at least four indentations; and
c) at least two of said at least two fixture supports are sized for supporting a first type of fastener, and at least two of said at least two fixture supports are sized for supporting a second type of fixture fastener.

* * * * *